(12) United States Patent
Berthelsen

(10) Patent No.: US 9,897,113 B2
(45) Date of Patent: Feb. 20, 2018

(54) SWITCHING VALVE CONTROL SYSTEM

(71) Applicant: Hallco Industries, Inc., Tillamook, OR (US)

(72) Inventor: Timothy M. Berthelsen, Tillamook, OR (US)

(73) Assignee: Hallco Industries, Inc., Tillamook, OR (US)

( * ) Notice: Subject to any disclaimer, the term of this patent is extended or adjusted under 35 U.S.C. 154(b) by 0 days.

(21) Appl. No.: 15/144,812

(22) Filed: May 2, 2016

(65) Prior Publication Data

US 2017/0314579 A1    Nov. 2, 2017

(51) Int. Cl.
*B65G 25/00* (2006.01)
*F15B 11/22* (2006.01)
*B65G 25/06* (2006.01)
*F15B 13/08* (2006.01)

(52) U.S. Cl.
CPC ............ *F15B 11/22* (2013.01); *B65G 25/065* (2013.01); *F15B 13/0832* (2013.01); *B65G 2811/09* (2013.01)

(58) Field of Classification Search
CPC .............................. B65G 25/00; F15B 13/042
USPC ............... 198/750.2, 750.5; 137/625, 625.12
See application file for complete search history.

(56) References Cited

U.S. PATENT DOCUMENTS

| | | | |
|---|---|---|---|
| 3,530,895 A | 9/1970 | Rothrock | |
| 3,534,875 A | 10/1970 | Hallstrom et al. | |
| 3,905,290 A | 9/1975 | Caughey | |
| 4,143,760 A | 3/1979 | Hallstrom | |
| 4,793,468 A | 12/1988 | Hamilton et al. | |
| 4,969,387 A | 11/1990 | Foster | |
| 5,103,866 A | 4/1992 | Foster | |
| 5,193,661 A | 3/1993 | Foster | |
| 5,222,593 A * | 6/1993 | Quaeck | B65G 25/065 198/750.5 |
| 5,315,916 A | 5/1994 | Foster | |
| 5,361,679 A * | 11/1994 | Foster | F15B 13/0402 137/596.15 |
| 5,427,229 A | 6/1995 | Foster | |
| 5,622,095 A * | 4/1997 | Foster | B65G 25/065 91/178 |
| 5,839,568 A * | 11/1998 | Clark | B65G 25/065 198/750.5 |
| 5,934,445 A * | 8/1999 | Foster | B65G 25/065 198/750.2 |
| 6,003,660 A * | 12/1999 | Foster | B65G 25/065 198/750.5 |

(Continued)

OTHER PUBLICATIONS

Solenoid Operators, "Solenoid Operators on Directional Control Valves," HydraulicsClass.5.SolenoidOperators.doc, Dec. 2004, 5 pages.

*Primary Examiner* — Douglas A Hess
(74) *Attorney, Agent, or Firm* — Law Office of Karen Dana Oster, LLC

(57) ABSTRACT

A switching valve module which is part of a switching valve control system for use with reciprocating slat-type conveyors is disclosed herein. Disclosed herein is a switching valve module that includes an inner control valve and an outer control valve. A spool is positioned within the inner control valve and a spool positioned within the outer control valve. Movement of each the spool creates both a spool-type seal and a poppet-type seal between the spool and the respective control valve.

18 Claims, 22 Drawing Sheets

(56) References Cited

U.S. PATENT DOCUMENTS

| | | | |
|---|---|---|---|
| 6,209,580 B1 * | 4/2001 | Foster | F15B 13/0402 137/596.12 |
| 6,651,806 B2 | 11/2003 | Hallstrom | |
| 7,284,471 B2 * | 10/2007 | Jacobsen | F15B 13/04 91/433 |
| 7,926,646 B1 | 4/2011 | Berthelsen et al. | |
| 8,125,478 B2 | 2/2012 | Lin et al. | |
| 8,430,231 B2 | 4/2013 | Almond | |
| 8,453,678 B2 * | 6/2013 | Neff | F16K 11/07 137/625.27 |
| 8,616,365 B2 | 12/2013 | Berthelsen et al. | |
| 2014/0090960 A1 | 4/2014 | Berthelesen et al. | |

* cited by examiner

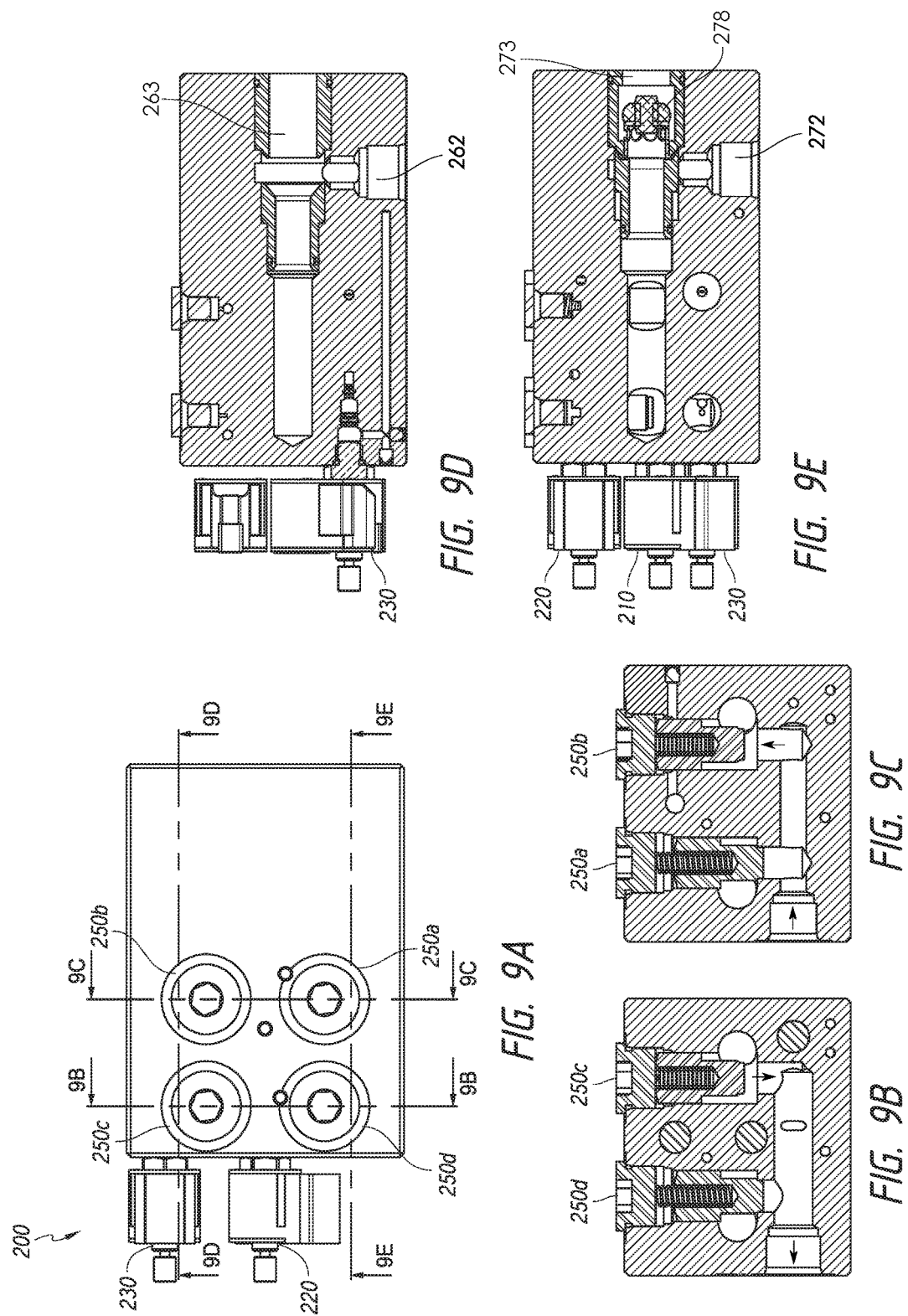

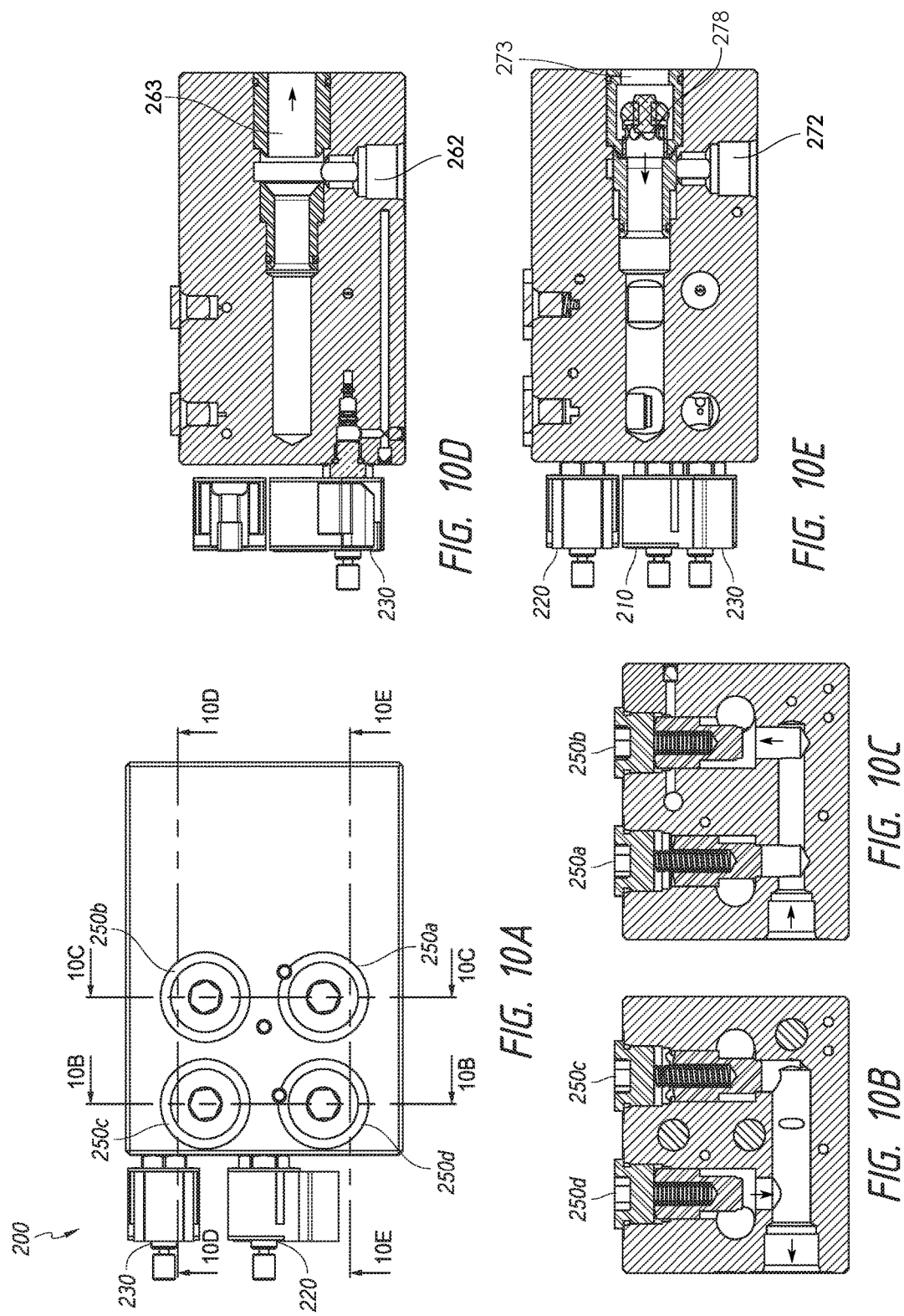

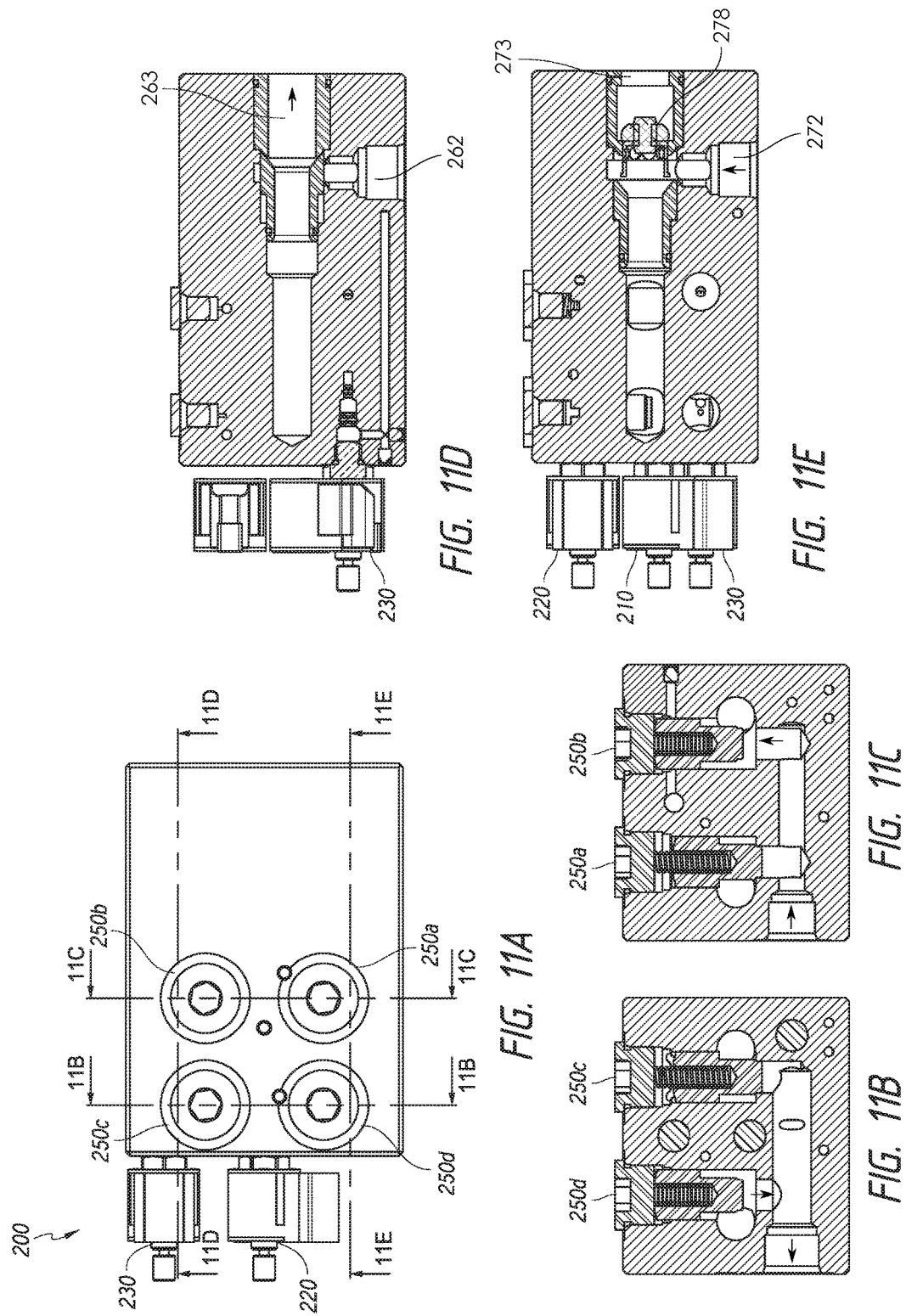

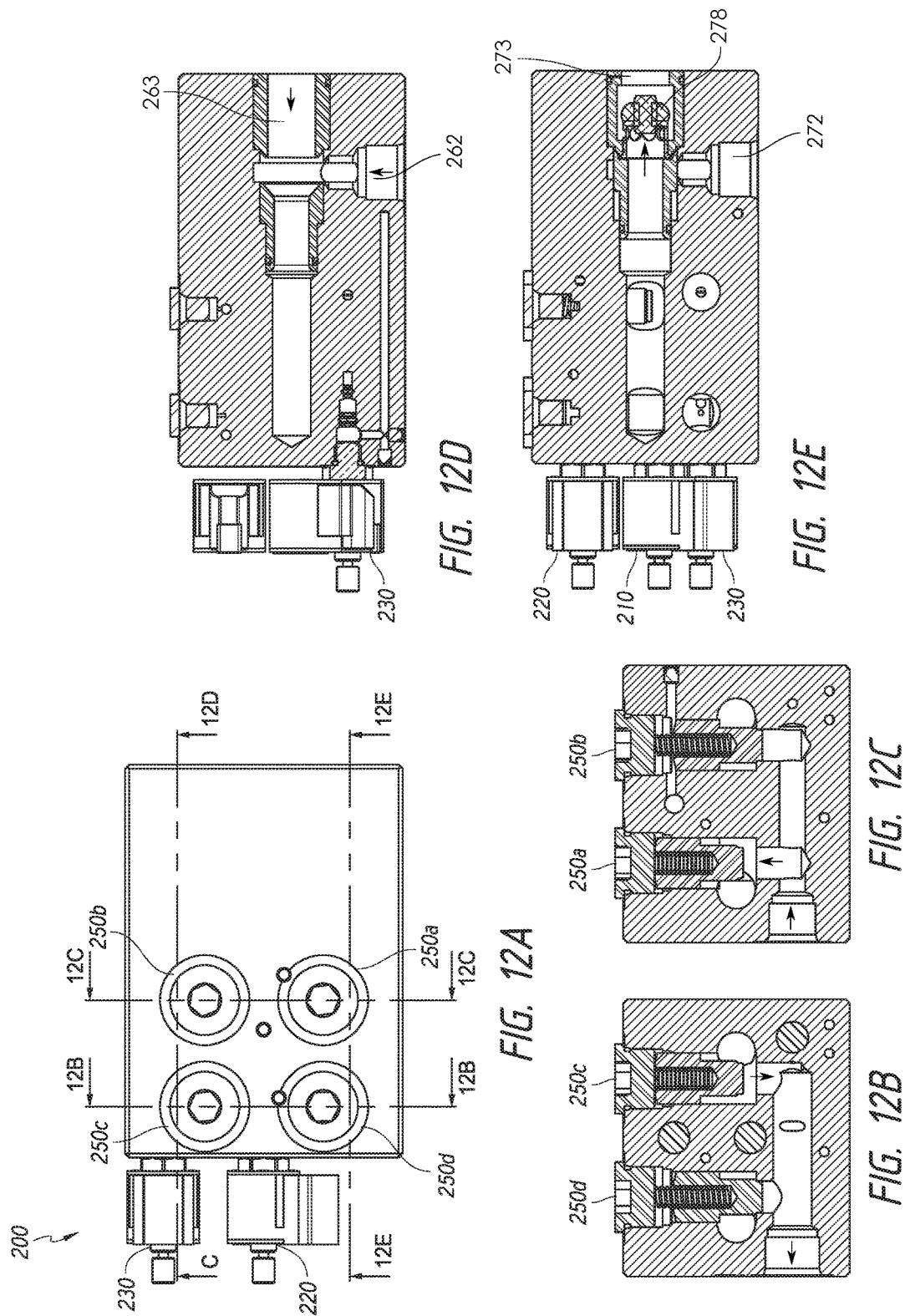

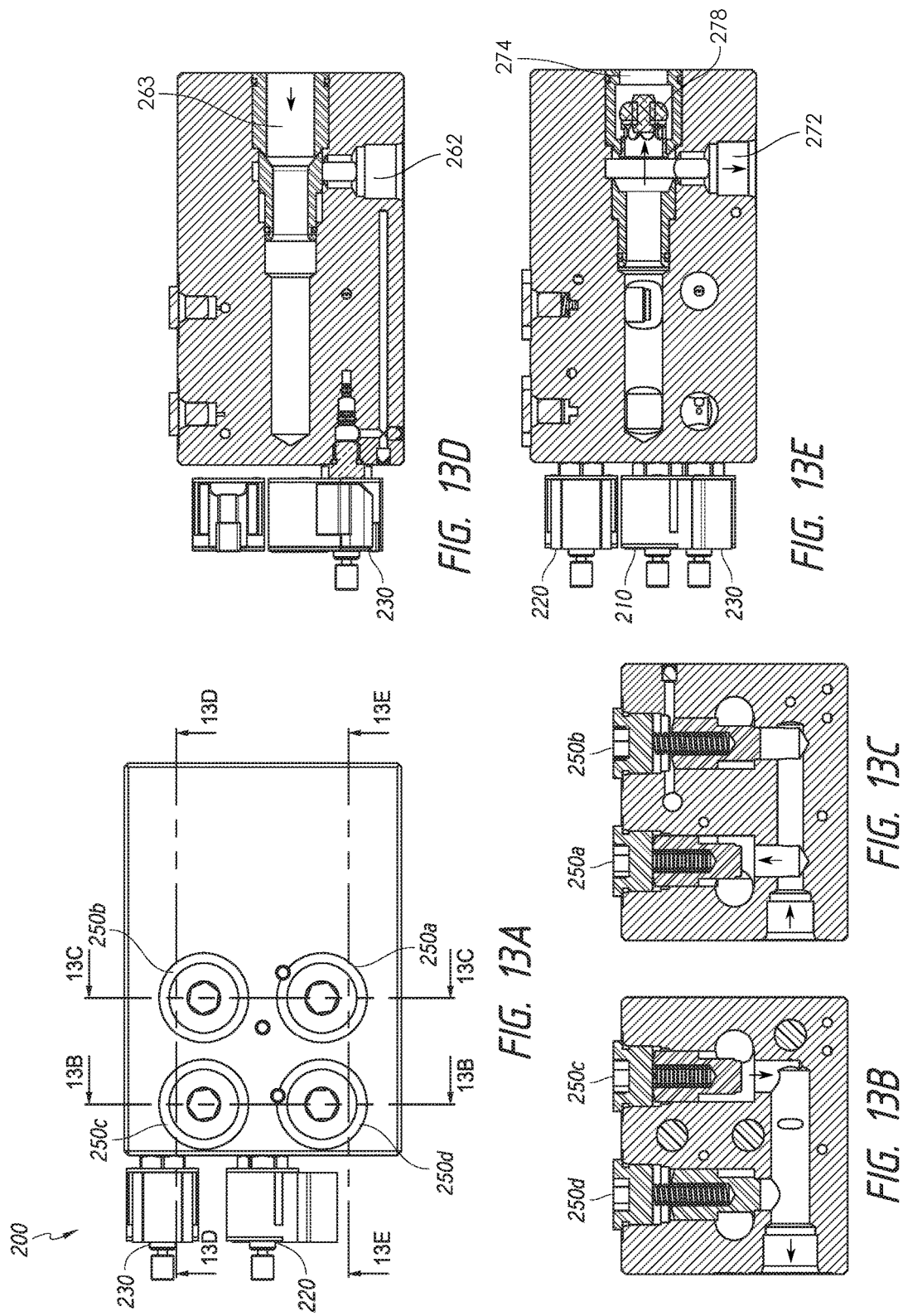

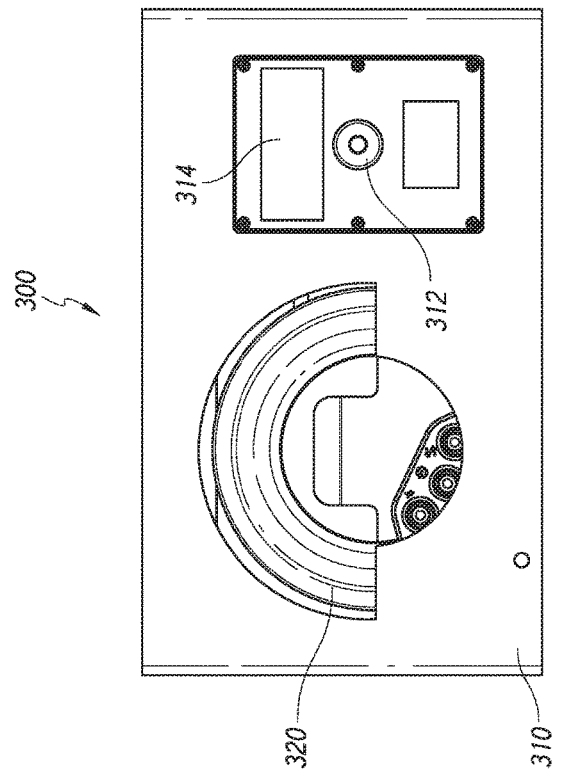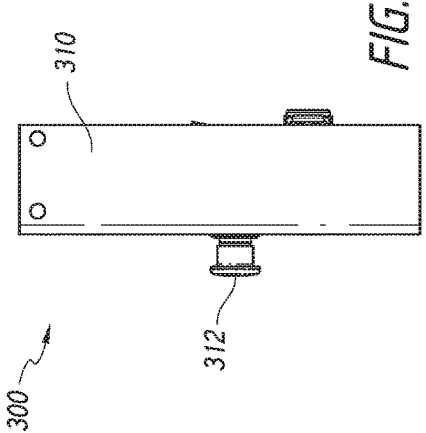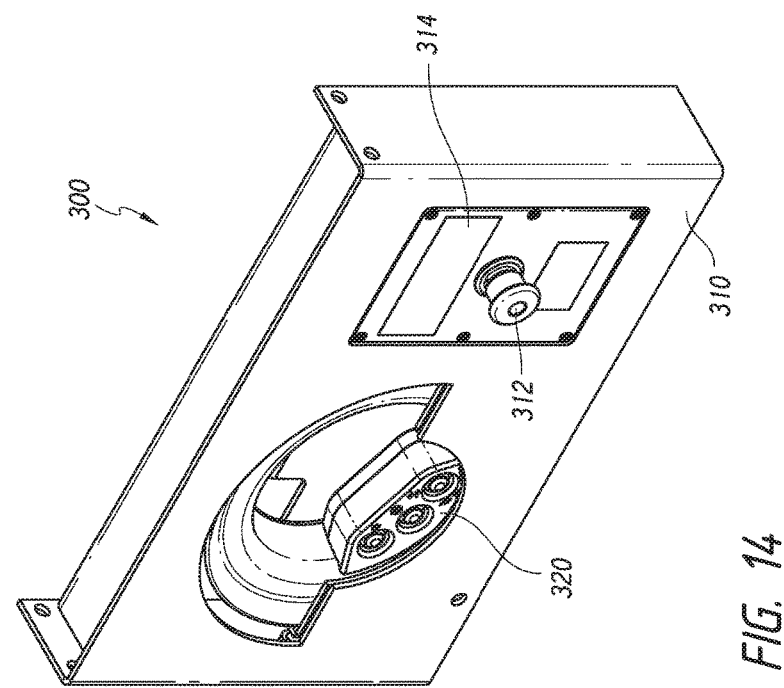

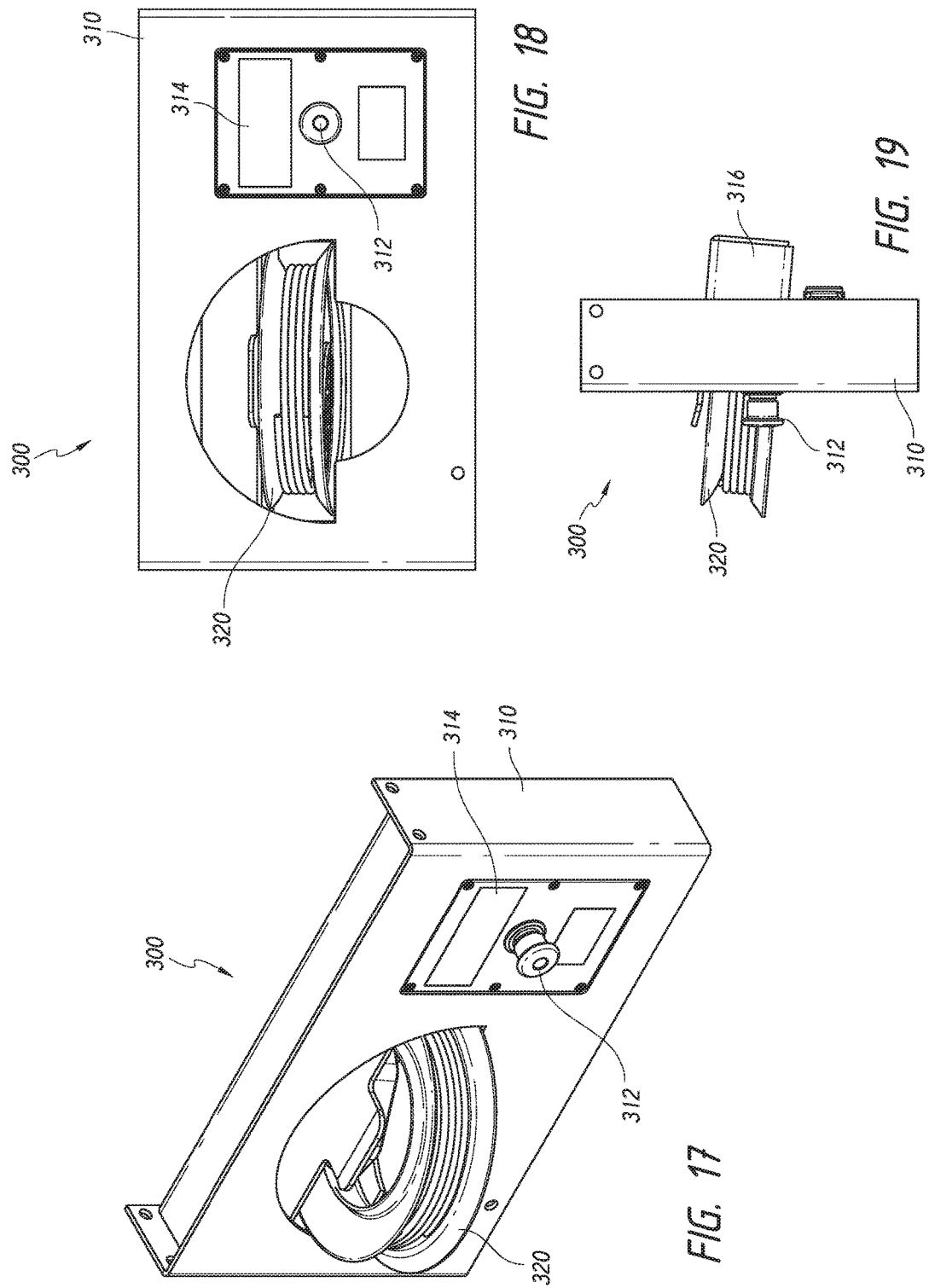

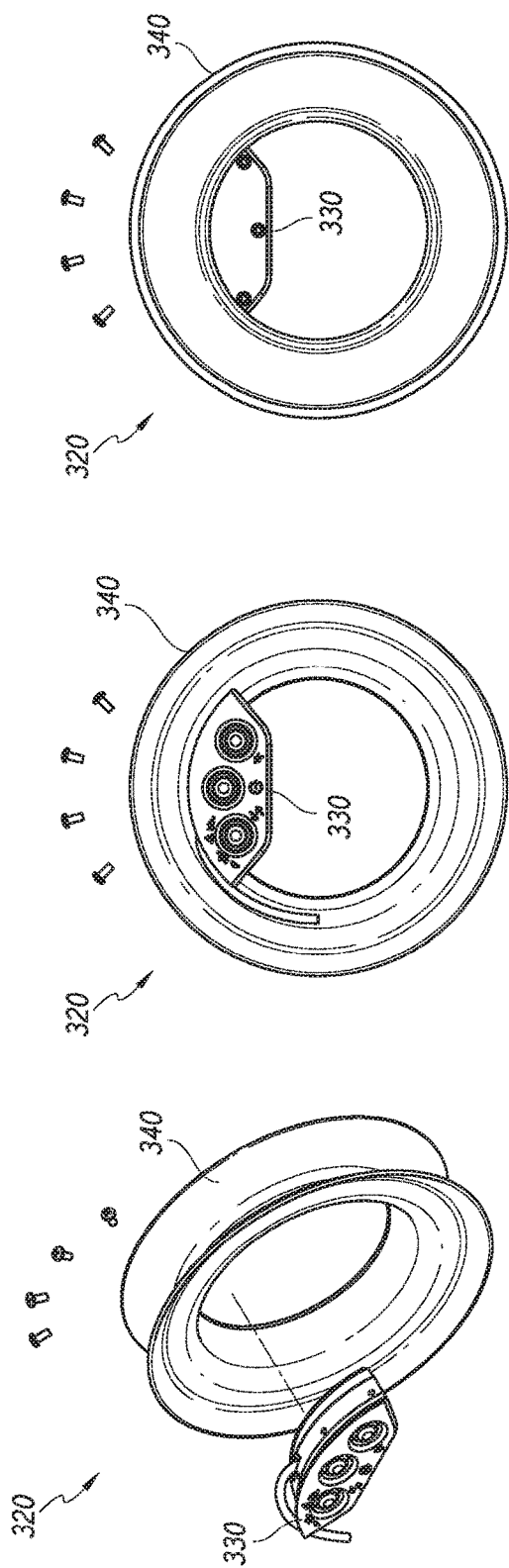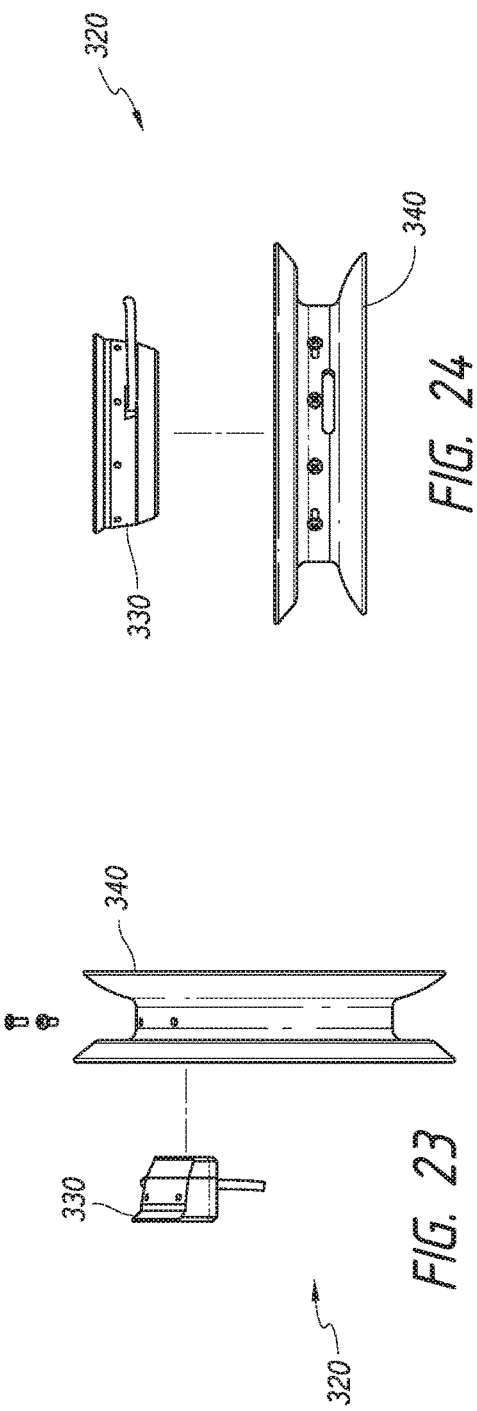

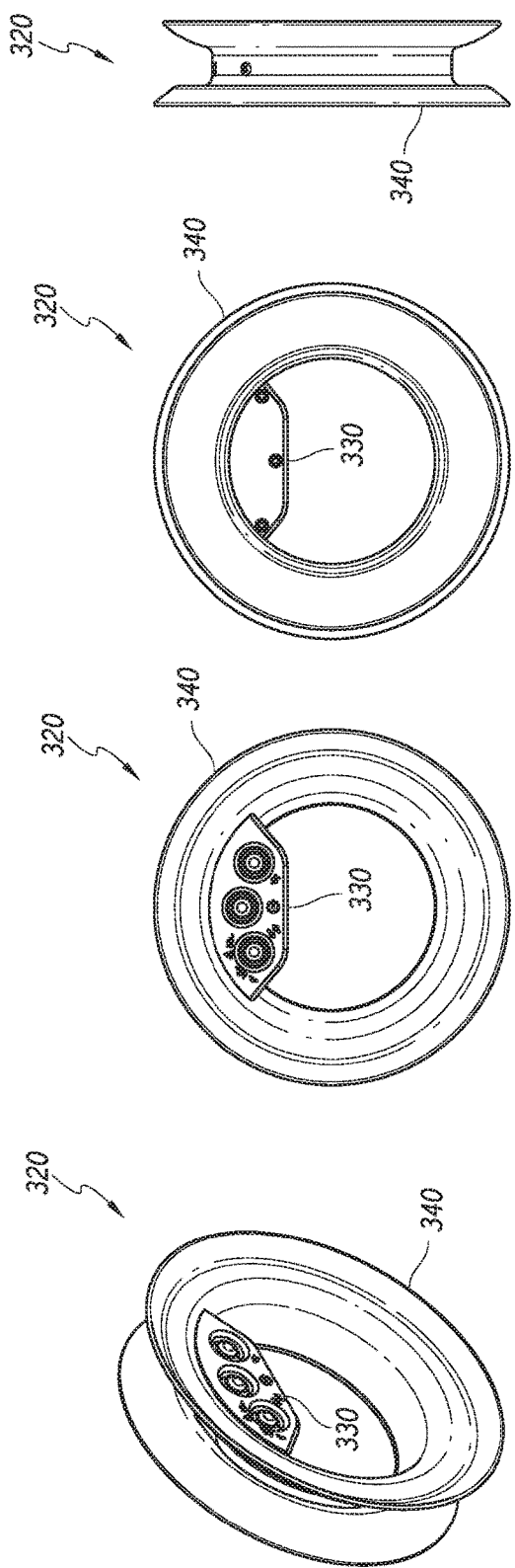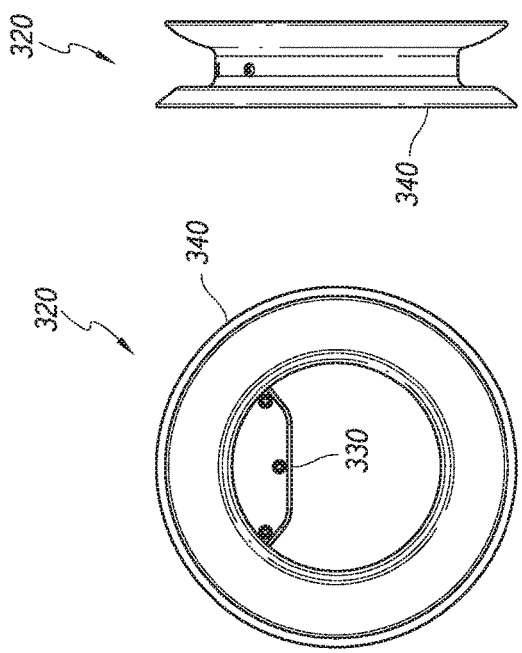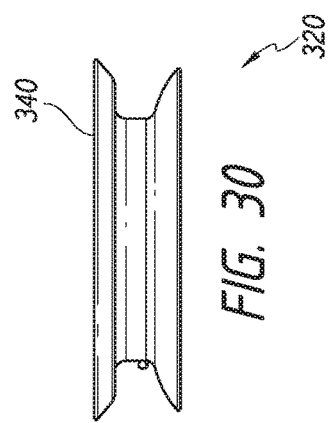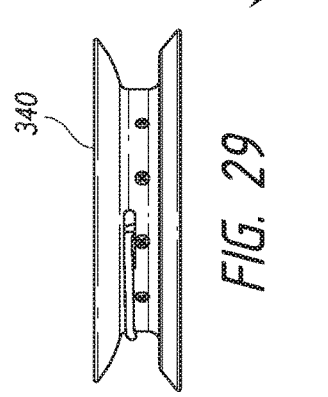

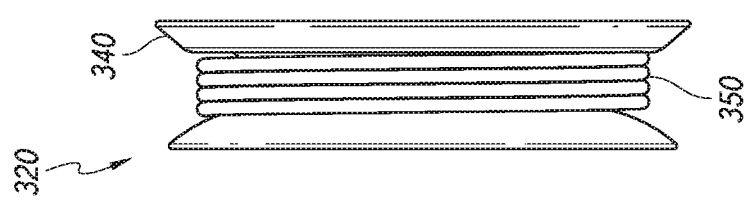
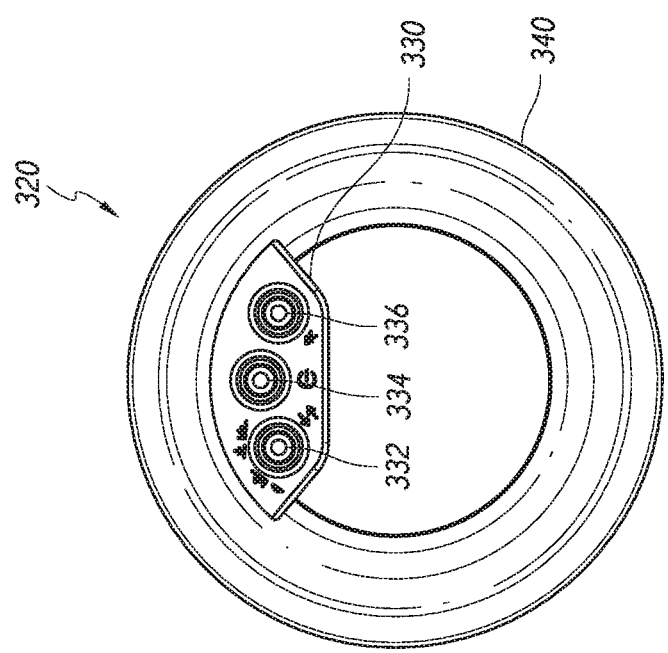
FIG. 32
FIG. 31

SWITCHING VALVE CONTROL SYSTEM

BACKGROUND OF THE INVENTION

Reciprocating slat-type conveyors (also referred to as, "RSCs," "conveyor systems," "live floor conveyors," "reciprocating slat conveyors," or "conveyors") generally include a plurality of elongated slats (also referred to as "conveyor slats," "floor slats," or "deck slats"). The conveyors are generally used in the load-holding compartment of load transport vehicles (e.g. a mobile cargo trailer, bed of a truck (truck bed), rear portion of a semi-trailer, or container portion of a van-truck). The slats are arranged side-by-side to form the floor of the load-holding compartment so that they extend longitudinally to the framework of the load-holding compartment. A "load" may be, for example, grain, fertilizer, soil, sand, shredded documents, chipped wood, sawdust, garbage, or any particulate matter. The slats are generally grouped such that one group of slats (a group generally includes at least three slats although it is to be understood that each group may include any desired number in excess of two) moves simultaneously in one direction (the "load-conveying direction") and then returns one slat at a time (in the "retraction direction") to the beginning position. This operation results in a step-wise advance of the load positioned on the floor followed by a retraction of the slats without moving the load. Reciprocating slat-type conveyors are described in more detail in patents and patent applications assigned to and owned by applicant including, but not limited to, U.S. Pat. No. 8,125,478 entitled Adaptable Reciprocating Slat Conveyor, U.S. Pat. No. 8,430,231 entitled Adaptable Reciprocating Slat Conveyor, U.S. Pat. No. 7,926,646 entitled Double-Sealed, Bearingless, Reciprocating Conveyor with Slat Supporting Guide Trough Subdecks, U.S. Pat. No. 8,616,365 entitled Double-Sealed, Bearingless, Reciprocating Conveyor with Slat Supporting Guide Trough Subdecks, U.S. Pat. No. 6,651,806 entitled Sealless Slat Type Reciprocating Conveyor, and U.S. Patent Application Publication 2014/0090960 entitled Bearingless Reciprocating Slat-Type Conveyor Assemblies.

The following descriptions of patents are meant to describe known systems.

U.S. Pat. No. 3,530,895 to Rothrock (the "Rothrock reference") directed to an automatic fluid pressure switching valve. Described as a hollow switching valve body houses a hollow sleeve freely reciprocative therein, and a control stem extends slidably through the body and sleeve. A pair of spaced conductor grooves in the sleeve cooperates with an inlet port, a pair of outlet ports and an exhaust port in the body to deliver fluid under pressure from the inlet port selectively to the pair of outlet ports and exhaust port. A by-pass groove in the movable control stem cooperates with a by-pass port in the sleeve between the conductor grooves to by-pass fluid under pressure from the inlet port selectively to opposite ends of the sleeve to move the latter and switch the delivery of fluid under pressure from one outlet port to the other. This reference describes a pilot spool controlled switching valve that is commonly used to control a reciprocating slat-type conveyor.

U.S. Pat. No. 3,534,875 to Hallstrom, Jr. (the "Hallstrom, Jr. reference") describes a reciprocating conveyor and more specifically, a plurality of groups of at least three elongated slats that are arranged side by side to form a conveyor type truck bed. The slats of each group are connected to a drive mechanism in such manner that there are always a greater number of slats of each group moving simultaneously in the conveying direction while the remaining slat or slats of the group move in the opposite direction. This patent (which is assigned to and owned by the applicant of the present invention) describes a cam and follower system. The cam is rotated and the followers drive the cross beams and slats so that more of the slats are moving in the conveying direction than are retracting. This patent also mentions that hydraulic cylinders or rack and pinion gears could be used to move the slats and that the direction of conveyance can be changed by rotating the cam in the opposite direction.

U.S. Pat. No. 3,905,290 to Caughey (the "Caughey reference") describes a self-feeding press for producing strip material. The Caughey reference describes a press for compacting and integrating material to form a continuous strip comprising spaced parallel arrays of long narrow bars, a frame supporting the bars in each array for reciprocal movement, a feeder for supplying material to the space between the arrays of bars at one end of the press, rams for effecting relative movement of the arrays of bars toward each other to apply compacting pressure, and rams for effecting longitudinal movement of the bars in each array in a predetermined succession in one direction and for retracting all of the bars in consonance in the other direction. The reciprocating slat-type conveyor described in the Caughey reference is driven by hydraulic or pneumatic rams, each ram being controlled by a four-way switching valve to control which direction it is moving. The four-way switching valves are controlled by solenoids. The solenoids are controlled by switches which are turned on and off by a rotating cam system that is driven by a hydraulic or electric motor. The Caughey reference does not describe, does not appear to contemplate, and/or does not appear to modify (without significant re-design) a system or method for reversing the direction of conveyance.

U.S. Pat. No. 4,143,760 to Hallstrom (the "Hallstrom reference") describes a reciprocating conveyor, and, more specifically, at least one group of at least three elongated slats mounted side-by-side on a frame for longitudinal reciprocation to form a conveyor, the slats being connected to a fluid pressure drive mechanism which is operable to move all of the slats of each group from a start position simultaneously in a load-conveying direction and then to move the slats of each group sequentially in the opposite direction from the advanced position back to the start position, the slats of each group being interengaged releasably in the conveying direction to insure simultaneous movement. This patent (which is assigned to and owned by the applicant of the present invention) describes a reciprocating slat-type conveyor that is driven by hydraulic rams; the sequencing of the rams is controlled by check valves. The direction of motion (either extending or retracting) of all of the rams is controlled by a four-way hydraulic valve (switching four-way valve). The switching four-way valve is controlled by a pilot four-way valve that is moved back and forth by the motion of the cross beams that the slats are attached to. This pilot valve functions to latch the switching four-way valve in one or the other of two positions. The direction of conveyance is changed by a separate, hand controlled, hydraulic valve which either bypasses the check valves or does not bypass them (see the description for details).

U.S. Pat. No. 4,793,468 to Hamilton et al. (the "Hamilton reference") directed to a multiphase sliding floor for continuous material movement. The Hamilton reference further describes the invention as an apparatus, and a related method, for controlling a moving floor having multiple sliding slats, to produce a practically continuous load-moving force on a load carried on the apparatus. The slats are reciprocated back and forth by hydraulic cylinders, each of which controls a group of slats that are moved together. At any given time, a majority of slats are moving together in the desired direction, and carry a load in this direction at a nearly uniform velocity. The remainder of the slats is moved in a reverse direction, but at a speed that is a multiple of the forward speed of the majority of the slats. Each group of slats is moved through a forward stroke at a relatively low speed; then through a backward stroke at a higher speed. This reference discusses the use of magnets for triggers for a proximity switch to sense the positions of the slats to set the timing of the slat motion. This reference also discusses using a linear sensor to actually sense the position of the slats for more precise control. This reference further discusses the use of a computer processor to control the sequencing of the slats. The exiting oil from the slowly moving cylinders is routed through the one cylinder that is retracting making it go faster. The controller switches the valves at the appropriate times for proper operation of the system (see paragraph beginning at column 4, line 8). Change of conveyance direction is accomplished by changing how the switching valve of each cylinder is switched (see paragraph beginning at column 8, line 34). Each cylinder has its own three- or four-way valve. The annulus (ring-shaped) end(s) (of all of the cylinders) are joined.

U.S. Pat. No. 4,969,387 to Foster (the "'387 reference") is directed to a hydraulic drive unit with single piston rod and plural cylinder bodies. The hydraulic drive unit contains a plurality of piston heads (P1, P2, P3) that are spaced apart along the length of a single piston rod (R). A separate traveling cylinder body (CB1, CB2, CB3) is associated with each piston head (P1, P2, P3). The traveling cylinder bodies (CB1, CB2, CB3) and the piston heads (P1, P2, P3) define first fluid chambers (1A, 2A, 3A) on a common side of the piston heads (P1, P3, P3) and a set of second fluid chambers (1B, 2B, 3B) on a common opposite side of the piston heads (P1, P2, P3). A separate fluid supply and return passageway is provided within the piston rod (R) for each of the working chambers (1A, 1B, 2A, 2B, 3A, 3B). Center members (C1, C2, C3) are secured within the hollow interior of the piston rod (R) and serve to divide the hollow interior into four axial sections (122, 124, 126, 128). The piston rod (R) includes first and second end members (RE1, RE2). The first end member (RE1) includes outer end ports (P1A, P1B, P2A) for the fluid delivery and return passageways for three of the working chambers (1A, 1B, 2A). End member (RE2) includes outer end ports (P2B, P3A, P3B) for the fluid delivery and return passageways for the remaining three working chambers (2B, 3A, 3B). The fluid delivery and return passageways are defined in part by concentric tubes (118, 120, 70, 66) located within piston rod (R) and the inner spaces (122, 124, 126, 128). The control system for transmitting fluid pressure to and from the working chambers (1A, 1B, 2A, 2B, 3A, 3B) includes sequencing valves which are separate units from the piston rod (R), the piston heads (P1, P2, P3) and the cylinder bodies (CB1, CB2, CB3). The sequencing valves are positioned to control the delivery of pressure fluid into the working chambers (1A, 1B, 2A, 2B, 3A, 3B). The '387 reference, therefore, describes the cylinders that are working off of one common shaft instead of each cylinder having its own.

U.S. Pat. No. 5,103,866 to Foster (the "'866 reference") describes a poppet valve and valve assemblies utilizing the same and, more specifically, in a housing, there is formed, in series, a first end cavity, a first cylinder cavity, a pressure cavity, a second cylinder cavity and a second end cavity. The cavities are separated by walls which include orifices. Two identical valve members are located in the housing. The first valve member has a piston and a valve plug in the first end cavity and a valve plug in the pressure cavity. The second valve member has a piston and a valve plug in the second end cavity and a valve plug in the pressure cavity. Pressure in the pressure cavity acts on the confronting ends of the two valve members. A two position control rod, in a first position, connects pressure to the piston in the first end chamber and connects the second end chamber to return. The piston has a larger area than the second end of the valve member, creating a force differential which moves the first valve member endwise inwardly. Pressure acting on the second end of the second valve member moves it endwise outwardly. The same control rod, in its second position, connects the second piston with pressure and the first piston with return. Pressure acting on the second end of the first valve member moves it endwise outwardly. Pressure acting on the second piston moves the second valve member endwise inwardly. Such movement of the valve members moves the valve plugs to open and close orifices in the separator walls, to switch pressure and return between two paths leading from the valve assembly. This reference describes a typical switching valve used on reciprocating slat-type conveyors for switching the hydraulic fluid direction. The '866 reference does not describe any way to isolate the cylinders from the hydraulic supply to turn the system off.

U.S. Pat. No. 5,193,661 to Foster (the "'661 reference") describes a system of linear hydraulic motors and further, that the piston rods (10, 12, 14) of three linear hydraulic motors (M1, M2, M3) are stationary and include fluid pressure passageways (40, 52, 42, 54, 44, 56) which direct fluid pressure into and out from working chambers (16, 34, 18, 36, 20, 38) on opposite sides of piston heads (22, 24, 26). Movable cylinder barrels (16, 18, 20) are connected to a load, e.g. floor members (FM1, FM2, FM3) of a reciprocating floor conveyor (FIG. 18). The outer ends of the piston rods (10, 12, 14) include balls and the balls include ports (46, 58, 48, 60, 50, 62) through which fluid pressure is delivered or removed. Associated with each port is a limit valve LV1, LV2, LV3, LV4, LV5, LV6. Limit valves (LV1, LV2, LV3) are pushed into an open position by a retraction of the motors (M1, M2, M3). Limit valves (LV4, LV5, LV6) are pulled into an open position by extension of motors (M1, M2, M3). The limit valves (LV1, LV2, LV3, LV4, LV5, LV6) includes springs biasing them into closed positions. The push and pull forces are in a direction opposite this spring force. Limit valves (LV1, LV2, LV3, LV4, LV5, LV6) are also opened by line pressure when flow is in a direction opposing the spring force. The system includes a two position switching valve (SV) controlled by a two position pilot valve (PV). The system operates to move the motors (M1, M2, M3) in unison, in a first direction, and to retract them sequentially. The system is reversible. This reference describes a control system that uses pilot operated check valves to bypass or enable the sequencing poppets of the hydraulic cylinders to change the direction of conveyance. This reference also describes a switching valve that is controlled by a separate pilot spool. The switching valve is a system of poppets. U.S. Pat. No. 5,315,916 to Foster (the "'916 reference") and U.S. Pat. No. 5,427,229 to Foster (the "'229 reference") are similar to the '661 reference.

BRIEF SUMMARY OF THE INVENTION

Described herein is a switching valve control system for use with reciprocating slat-type conveyors. In particular, the switching valve control system may be used in multi-operating-mode (adaptable) reciprocating slat conveyors. Preferred switching valve control systems incorporate a unique hydraulic module, a magnetic sensor module (rather than mechanical linkages), an electronic control module (rather than manual controls), a unique switching valve module, and/or other features and components shown or described herein.

The switching valve control system of the present invention improves known systems for controlling reciprocating slat-type conveyors and, in particular, multi-operating-mode (adaptable) reciprocating slat conveyors. For example, the switching valve control system described herein improves the safety of known reciprocating slat-type conveyors.

First Preferred Exemplary Switching Valve Module:

Disclosed herein is a switching valve module that includes an inner control valve and an outer control valve. A spool is positioned within the inner control valve and a spool positioned within the outer control valve. Movement of each of the spools creates both a spool-type seal and a poppet-type seal between the spool and the respective control valve.

The switching valve module wherein the inner control valve and the outer control valve are controlled to change the conveying direction of a reciprocating slat conveyor between a load conveying direction and an unload conveying direction.

The switching valve module wherein the inner control valve further has (a) an inner port with an inner bypass, the inner bypass intersecting the inner port; (b) an inner control valve seat associated with the inner port; (c) the spool-type seal forming when the spool positioned within the inner control covers the inner bypass; and (d) the poppet-type seal forming when the spool positioned within the inner control engages the inner control valve seat. The switching valve module wherein the outer control valve further has (a) an outer port with an outer bypass, the outer bypass intersecting the outer port; (b) an outer control valve seat associated with the outer port; (c) the spool-type seal forming when the spool positioned within the outer control covers the outer bypass; and (d) the poppet-type seal forming when the spool positioned within the outer control engages the outer control valve seat.

The switching valve module wherein at least one of the inner control valve and the outer control valve having a remedial check valve.

The switching valve module wherein the switching valve module for use with a reciprocating slat-type conveyor for loading and unloading a container, the reciprocating slat-type conveyor having a plurality of slats, the plurality of slats arranged side-by-side for conveying a load in one of a first operational direction and a second operational direction, the plurality of slats grouped in at least two sets of slats, each set of slats joined together for simultaneous reciprocative movement, the plurality of slats arranged in a plurality of groups, each group having at least one correspondingly positioned slat within each set of slats.

The switching valve module further includes (a) a first valve, a second valve, and a third valve; (b) a plurality of poppets, the plurality of poppets dividable into a first pair of poppets and a second pair of poppets; (c) the first valve controlling the plurality of poppets; (d) the second valve controlling which poppets are in the first pair of poppets and which poppets are in the second pair of poppets; and (e) the third valve controlling the inner control valve and the outer control valve to change the conveying direction of a reciprocating slat conveyor between a load conveying direction and an unload conveying direction.

Second Preferred Exemplary Switching Valve Module:

Disclosed herein is a switching valve module for use with a reciprocating slat-type conveyor for loading and unloading a container, the reciprocating slat-type conveyor having a plurality of slats, the plurality of slats arranged side-by-side for conveying a load in one of a first operational direction and a second operational direction, the plurality of slats grouped in at least two sets of slats, each set of slats joined together for simultaneous reciprocative movement, the plurality of slats arranged in a plurality of groups, each group having at least one correspondingly positioned slat within each set of slats. The switching valve module includes an inner control valve and an outer control valve. A movable spool is positioned within the inner control valve and a movable spool is positioned within the outer control valve. The inner control valve further includes: (a) an inner port with an inner bypass, the inner bypass intersecting the inner port; (b) an inner control valve seat associated with the inner port; (c) the spool-type seal being formed when the movable spool positioned within the inner control covers the inner bypass; and (d) the poppet-type seal being formed when the movable spool positioned within the inner control engages the inner control valve seat. The outer control valve further includes: (a) an outer port with an outer bypass, the outer bypass intersecting the outer port; (b) an outer control valve seat associated with the outer port; (c) a spool-type seal being formed when the movable spool positioned within the outer control covers the outer bypass; and (d) a poppet-type seal being formed when the movable spool positioned within the outer control engages the outer control valve seat.

The switching valve module wherein the inner control valve and the outer control valve being controlled to change the conveying direction of a reciprocating slat conveyor between a load conveying direction and an unload conveying direction.

The switching valve module wherein at least one of the inner control valve and the outer control valve having a remedial check valve.

The switching valve module further includes: (a) a first valve, a second valve, and a third valve; (b) a plurality of poppets, the plurality of poppets dividable into a first pair of poppets and a second pair of poppets; (c) the first valve controlling the plurality of poppets; (d) the second valve controlling which poppets are in the first pair of poppets and which poppets are in the second pair of poppets; and (e) the third valve controlling the inner control valve and the outer control valve to change the conveying direction of a reciprocating slat conveyor between a load conveying direction and an unload conveying direction.

Third Preferred Exemplary Switching Valve Module:

Disclosed herein is a switching valve module for use with a reciprocating slat-type conveyor for loading and unloading a container, the reciprocating slat-type conveyor having a plurality of slats, the plurality of slats arranged side-by-side for conveying a load in one of a first operational direction and a second operational direction, the plurality of slats grouped in at least two sets of slats, each set of slats joined together for simultaneous reciprocative movement, the plurality of slats arranged in a plurality of groups, each group having at least one correspondingly positioned slat within each set of slats. The switching valve module includes: (a) a first valve, a second valve, and a third valve; (b) a plurality of poppets, the plurality of poppets dividable into a first pair of poppets and a second pair of poppets; (c) an inner control valve and an outer control valve; (d) the first valve controlling the plurality of poppets; (e) the second valve controlling which poppets are in the first pair of poppets and which poppets are in the second pair of poppets; and (f) the third valve controlling the inner control valve and the outer control valve to change the conveying direction of the reciprocating slat conveyor between a load conveying direction and an unload conveying direction.

The switching valve module wherein the switching valve module controls a multi-operating-mode reciprocating slat conveyor.

The switching valve module wherein the switching valve module is controlled based on input from a sensor module that provides information about the relevant position of the slats.

The switching valve module wherein the switching valve module is controlled based on input from an electronic control module that functions as a user interface.

The switching valve module wherein the switching valve module is controlled based on input from a sensor module that provides information about the relevant position of the slats, and based on input from an electronic control module that functions as a user interface.

The switching valve module wherein the plurality of poppets are to switch high volume flow of fluid to cylinders of the reciprocating slat conveyor, and the same plurality of poppets are used to block flow of fluid to the cylinders and open flow back to a tank and thereby turn the reciprocating slat-type conveyor off.

The switching valve module wherein the inner control valve and the outer control valve each having a spool that creates both a spool-type seal and a poppet-type seal.

The switching valve module wherein at least one of the inner control valve and the outer control valve having a remedial check valve.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings illustrate various exemplary switching valve control systems for use with reciprocating slat-type conveyors and/or provide teachings by which the various exemplary switching valve control system for use with reciprocating slat-type conveyors are more readily understood.

FIGS. 9A-9E are a plan view and four cross-sectional views of an exemplary preferred switching valve module in the 0-0-0 or off state.

FIGS. 10A-10E are a plan view and four cross-sectional views of an exemplary preferred switching valve module in the 0-1-0 or retracting separately state.

FIGS. 11A-11E are a plan view and four cross-sectional views of an exemplary preferred switching valve module in the 0-1-1 or retracting together state.

FIGS. 12A-12E are a plan view and four cross-sectional views of an exemplary preferred switching valve module in the 1-1-0 or extending together state.

FIGS. 13A-13E are a plan view and four cross-sectional views of an exemplary preferred switching valve module in the 1-1-1 or extending separately state.

FIG. 14 is a perspective view of an exemplary preferred electronic control module having an electronic control mounted housing unit and an electronic control removable unit, the electronic control module being shown in a first configuration with the rotational storage tray nested within the mounted housing unit.

FIG. 15 is a front view of the exemplary preferred electronic control module of FIG. 14.

FIG. 16 is a first side view of the exemplary preferred electronic control module of FIG. 14, the second side view being substantially a mirror of the first side view.

FIG. 17 is a perspective view of an exemplary preferred electronic control module having an electronic control mounted housing unit and an electronic control removable unit, the electronic control module being shown in a second configuration with the rotational storage tray rotated out of the mounted housing unit to present the removable unit is easily accessible to the user.

FIG. 18 is a front view of the exemplary preferred electronic control module of FIG. 17.

FIG. 19 is a first side view of the exemplary preferred electronic control module of FIG. 17, the second side view being substantially a mirror of the first side view.

FIG. 20 is an exploded perspective view of an exemplary preferred electronic control removable unit of an exemplary preferred electronic control module, the controls shown unattached from the reel.

FIG. 21 is a front view of the exemplary preferred electronic control removable unit of FIG. 20.

FIG. 22 is a back view of the exemplary preferred electronic control removable unit of FIG. 20.

FIG. 23 is a first side view of the exemplary preferred electronic control removable unit of FIG. 20, the second side view being substantially a mirror of the first side view.

FIG. 24 is a first end view of the exemplary preferred electronic control removable unit of FIG. 20, the second end view being substantially identical thereto.

FIG. 25 is a perspective view of an exemplary preferred electronic control removable unit of an exemplary preferred electronic control module, the controls shown attached to the reel.

FIG. 26 is a front view of the exemplary preferred electronic control removable unit of FIG. 25.

FIG. 27 is a back view of the exemplary preferred electronic control removable unit of FIG. 25.

FIG. 28 is a first side view of the exemplary preferred electronic control removable unit of FIG. 25, the second side view being substantially a mirror of the first side view.

FIG. 29 is a top view of the exemplary preferred electronic control removable unit of FIG. 25.

FIG. 30 is a bottom view of the exemplary preferred electronic control removable unit of FIG. 25.

FIG. 31 is a front view of an exemplary preferred electronic control removable unit of an exemplary preferred electronic control module, the cable/line (not visible in this figure) wound around the reel.

FIG. 32 is a side view of an exemplary preferred electronic control removable unit of FIG. 31, the cable/line (not visible in this figure) wound around the reel.

Figure 1:
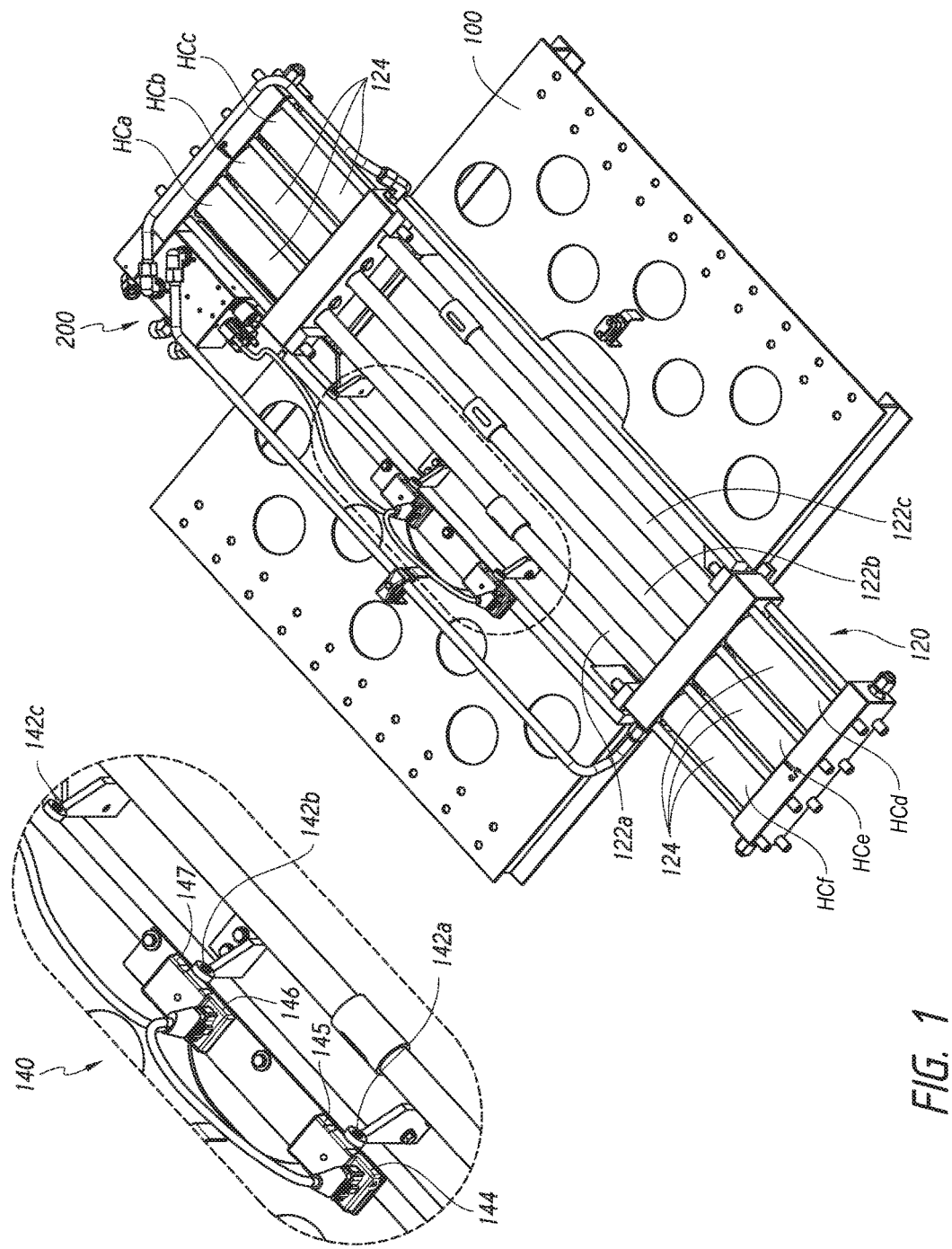
FIG. 1 is a perspective view of an exemplary preferred switching valve control system including an exemplary preferred base unit of an exemplary preferred center frame drive unit, the shown exemplary preferred base unit being shown with an exemplary hydraulic module, an exemplary magnetic sensor module (shown as an enlarged portion of the figure showing magnets and Hall Effect sensors), and an exemplary switching valve module.

The figures are not necessarily to scale. Certain features or components herein may be shown in somewhat schematic form and some details of conventional elements may not be shown or described in the interest of clarity and conciseness. The figures are hereby incorporated in and constitute a part of this specification.

DETAILED DESCRIPTION OF THE INVENTION

Described herein is a switching valve control system for use with reciprocating slat-type conveyors. In particular, the switching valve control system may be used in multi-operating-mode (adaptable) reciprocating slat conveyors. Preferred switching valve control systems incorporate a unique hydraulic module, a magnetic sensor module (rather than mechanical linkages), an electronic control module (rather than manual controls), a unique switching valve module, and/or other features and components shown or described herein.

Exemplary switching valve control systems may be better understood with reference to the drawings, but these switching valve control systems and components thereof are not intended to be of a limiting nature. The same reference numbers will be used throughout the drawings and description in this document to refer to the same or like parts. The shown shapes and relative dimensions are preferred, but are not meant to be limiting unless specifically claimed, in which case they may limit the scope of that particular claim.

U.S. Pat. No. 8,430,231 (referred to herein as the '231 patent, the '231 patent being assigned to and owned by the applicant of the present application) describes a concrete example (albeit not a limiting example that would limit the scope of the invention unless specifically required by the claims), of a multi-operating-mode (adaptable) reciprocating slat conveyor in which the switching valve control system described herein could be used. The disclosure relating to FIGS. 23-28 of the '231 patent describes a manual operating mode changing event between a three-step mode and a two-step mode. Whereas all three cross-drives CDa, CDb, CDc move in the three-step mode, only cross-drives CDa and CDb move in the two-step mode. When CDc does not move (in the two-step mode), the attached floor slats FSc are stationary (cease to move in the retracting direction or conveying direction). From the user's perspective, the manual operating mode changing event occurs when he manipulates an actuator (shown as actuator rod) to select either a two-step or three-step operating mode. The actuator rod controls a selector (adjustable selector that is associated with a switching rod) that can either engage with cross-drive trigger Tb (associated with cross-drive CDb) or it can bypass cross-drive trigger Tb and engage with cross-drive trigger Tc (associated with cross-drive CDc). The user's manipulation of the shown actuator rod, therefore, adjusts the position and/or alignment of adjustable selector with respect to the cross-drive trigger Tb. When the adjustable selector engages one of the cross-drive triggers (Tb or Tc), the switching rod is pushed forward so as to actuate a pilot operated switching valve which, in turn, controls the flow of hydraulic fluid (oil) in and between the hydraulic cylinders HCa, HCb, HCc. The hydraulic cylinders HCa, HCb, HCc, in turn, control the movement of the cross-drives CDa, CDb, CDc (cross-drive CDc being stationary in the two-step operating mode). When the switching rod actuates the switching valve, it changes the direction of the movement of the floor slats FSa, FSb, FSc. Also associated with the switching rod is a stationary selector that interacts with cross-drive trigger Ta (associated with cross-drives CDa). Regardless of the position of the actuator rod (and, therefore, in either the two-step operating mode or a three-step operating mode), when the stationary selector engages with cross-drive trigger Ta, the switching rod actuates (which can be pulling) the pilot operated switching valve to reverse the flow of hydraulic fluid (oil) in and between the shaft driving units 124 (shown as hydraulic cylinders HC) and thereby change the direction of the movement of the floor slats (FSa, FSb, FSc in the three-step operating mode and FSa and FSb in the two-step operating mode).

Hydraulic Module

FIGS. 1-5 show an exemplary preferred switching valve control system in a partially represented (i.e. slats and other components are not shown) multi-operating-mode (adaptable) reciprocating slat conveyor. FIG. 1 shows an exemplary preferred base unit (including a base 100, the hydraulic module 120, the magnetic sensor module 140, and the switching valve module 200) of an exemplary preferred center frame drive unit (which includes the cross-drives as shown in FIGS. 2-5 as well as other components (e.g. slats) that are not shown). Although the hydraulic module 120 is shown in other figures, some of the reference numbers for the hydraulic module 120 are only shown in FIG. 1.

In the shown example, the hydraulic module 120 includes three shafts 122a, 122b, 122c (generically referred to as 122). As shown, there are six shaft driving units 124 (shown as hydraulic cylinders HCa, HCb, HCc, HCd, HCe, HCf). As shown, HCa and HCd are primary cylinders, HCb and HCe are secondary cylinders, and HCc and HCf are tertiary cylinders. On each end of the shafts 122 there is a pair of shaft driving units 124. Put another way, each shaft 122 is powered by two shaft driving units 124 so there are two working surfaces on the same shaft. As shown, HCa and HCf power a first shaft 122a, HCb and HCe power a second shaft, and HCc and HCd power a third shaft. Each shaft driving unit 124 may include a piston and a cylinder around that piston. The use of two shaft driving units 124 for each shaft 122 provides more power and force for moving the shafts 122 and, therefore, the connected cross-drives CD and slats.

The shafts 122 are associated with their respective cross-drives CD which, in turn, are associated with their respective slats (not shown). As shown, therefore, shaft 122*a* is attached to cross-drive CDa, shaft 122*b* is attached to cross-drive CDb, and shaft 122*c* is attached to cross-drive CDc.

Magnetic Sensor Module

FIGS. 1-5 also show the magnetic sensor module 140. In particular, FIG. 1 shows an enlarged sensor module 140. Although the sensor module 140 is shown in other figures, the reference numbers for the sensor module 140 are only shown in the enlarged portion of FIG. 1.

The switching valve control system described herein eliminates the use of triggers Ta, Tb, and Tc which are used in the '231 patent. Instead, the switching valve control system described herein uses the magnetic sensor module 140. A preferred magnetic sensor module 140 includes a system of magnets 142 (shown as 142*a*, 142*b*, and 142*c*) and sensors 144, 145, 146, and 147. The magnets 142 are sensed by the sensors 144, 145, 146, and 147.

The sensors 144, 145, 146, and 147 are shown as Hall Effect sensors. Two of the sensors 144 and 145 are shown as being positioned on a first circuit board, and two of the sensors 146 and 147 are shown as being positioned on a second circuit board. As shown, the sensors are identical and are in the same orientation. A Hall Effect sensor is a small copper plate or a small semi-conductor with measured current that passes over it. The sensor can sense the current deviation which tells it when the magnetic field is present. When near a magnetic field, the sensor current is deflected to one side of the plate instead of going straight. The sensor current does a 90 degree turn. The sensors are going to send a signal to the processing unit when a magnetic field is present.

The magnets 142 are strategically associated with their respective shafts 122. As shown, magnet 142*a* is relatively located toward a first end of shaft 122*a* (which is associated with cross-drive CDa), magnet 142*b* is relatively located toward the middle of shaft 122*b* (which is associated with cross-drive CDb), and magnet 142*c* is relatively located toward a second end of shaft 122*c* (which is associated with cross-drive CDc). The magnets 142 are shown as being associated with a bracket that, in turn is associated with (shown as bolted onto) respective cross-drives that move back and forth via this bracket.

Figure 2:
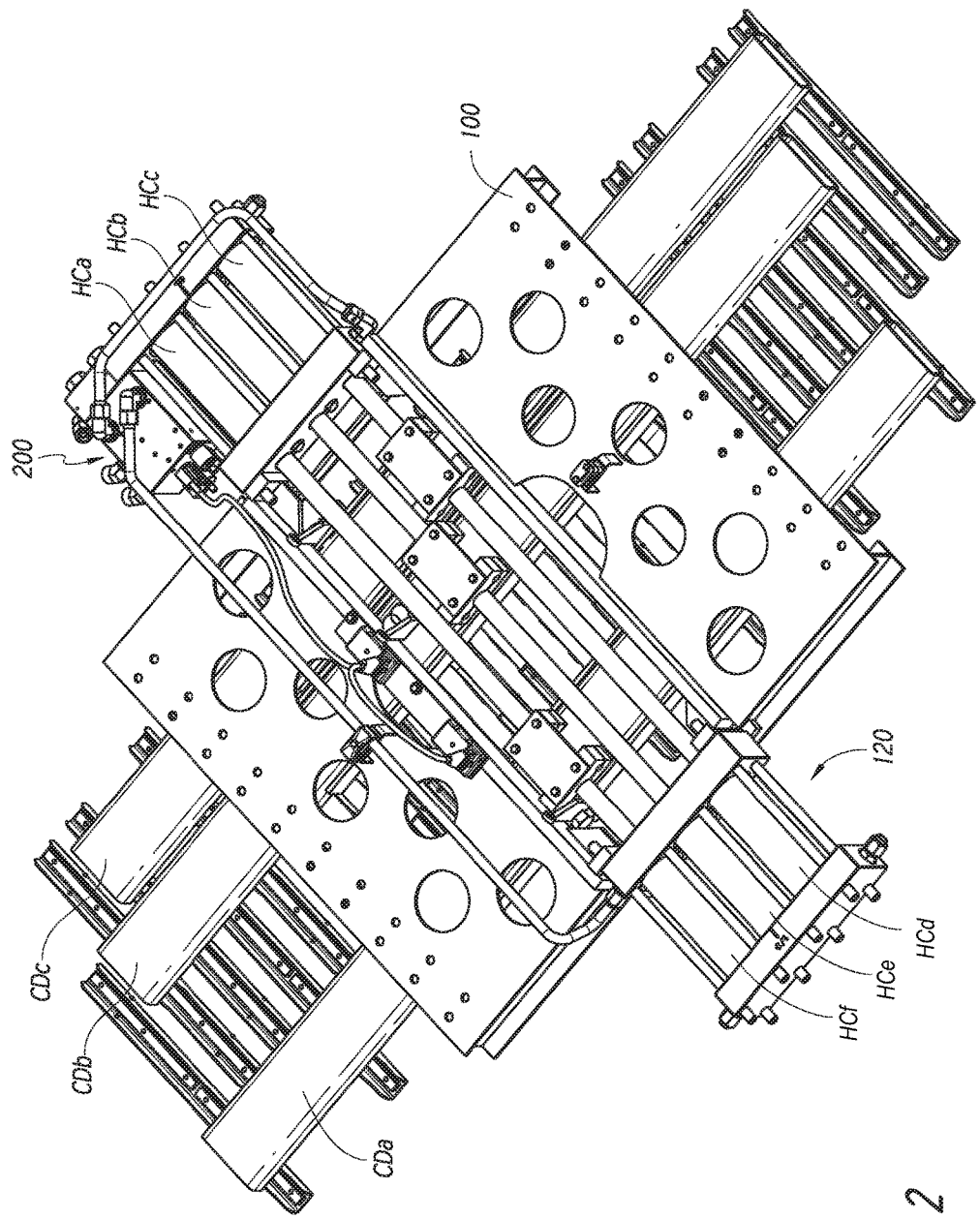
FIG. 2 is a perspective view of an exemplary preferred center frame drive unit of an exemplary preferred switching valve control system, cross-drive CDa being in an extended position, and cross-drive CDb and cross-drive CDc being in retracted positions.
Figure 3:
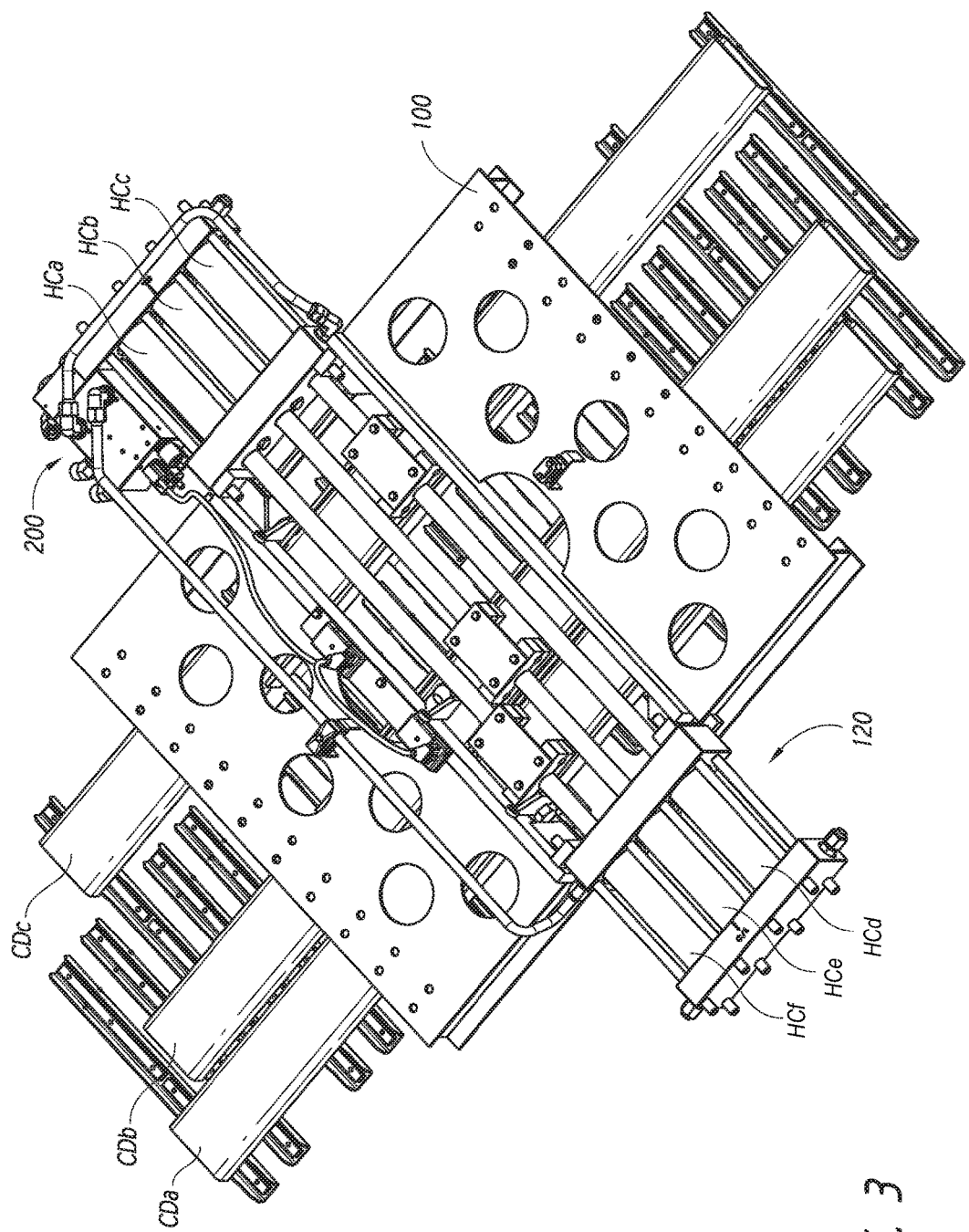
FIG. 3 is a perspective view of an exemplary preferred center frame drive unit of an exemplary preferred switching valve control system, cross-drive CDa and cross-drive CDb being in extended positions, and cross-drive CDc being in a retracted position.
Figure 4:
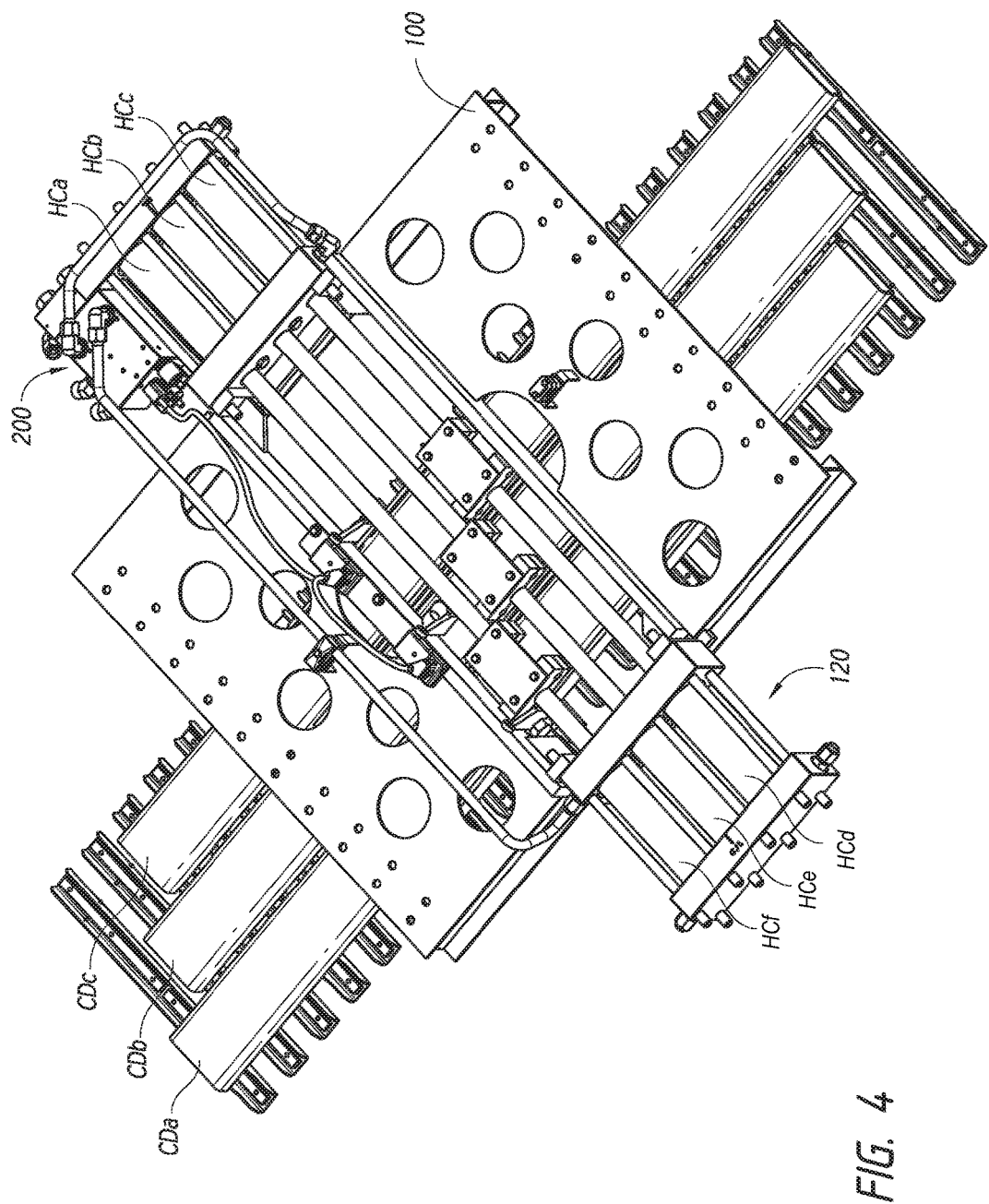
FIG. 4 is a perspective view of an exemplary preferred center frame drive unit of an exemplary preferred switching valve control system, all the cross-drives (CDa, CDb, and CDc) being in extended positions.
Figure 5:
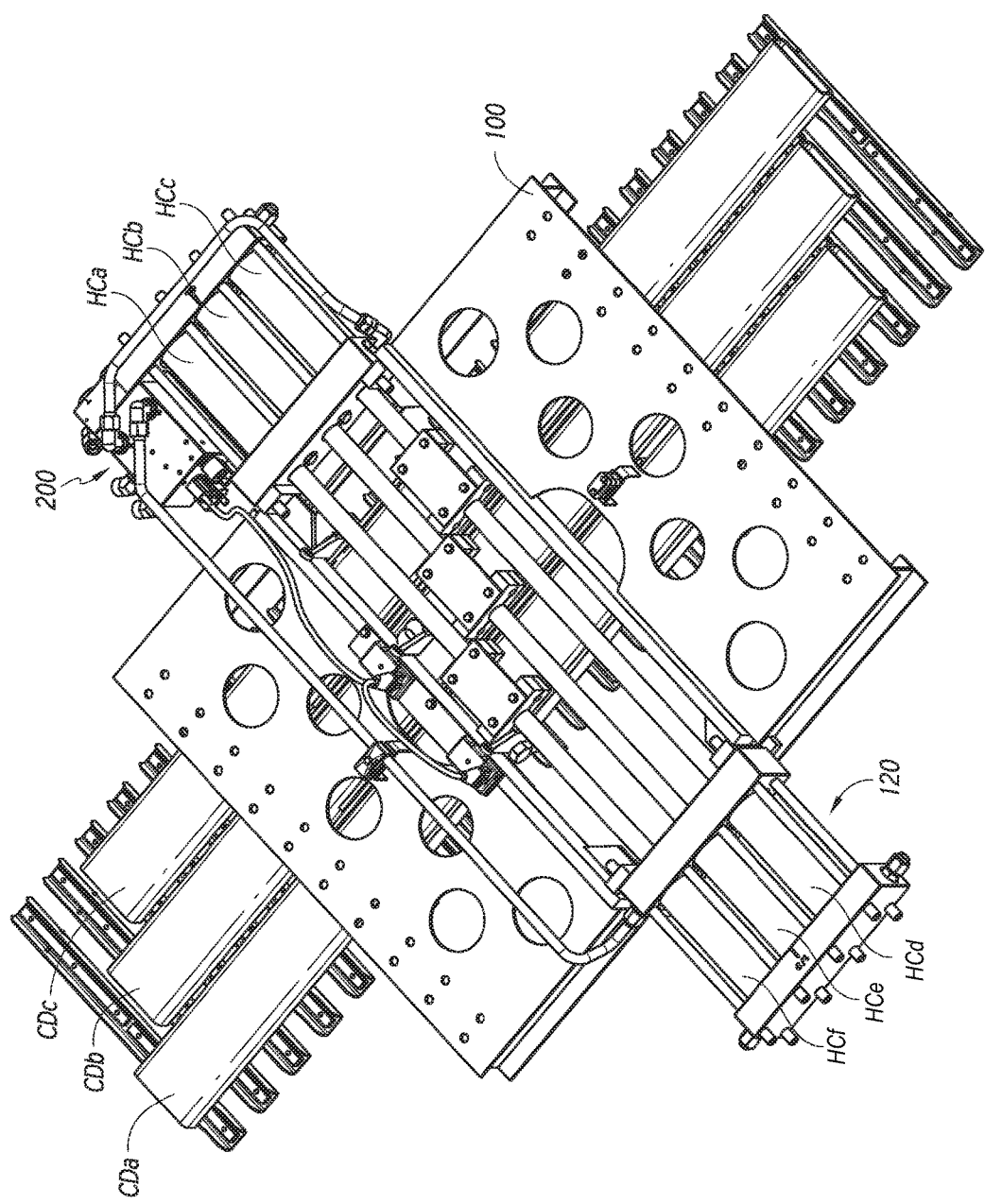
FIG. 5 is a perspective view of an exemplary preferred center frame drive unit of an exemplary preferred switching valve control system, all the cross-drives (CDa, CDb, and CDc) being in retracted positions.

The sensors 144, 145, 146, and 147 are strategically located to be able to sense the end of the stroke of the shaft driving units 124. With the shown multi-operating-mode (adaptable) reciprocating slat conveyor, the three-step mode (normal mode) is triggered using the end/outer magnets 142*a* and 142*c*. With the shown multi-operating-mode (adaptable) reciprocating slat conveyor, the two-step mode (accelerated mode) is triggered using the central magnet 142*b*. FIGS. 2, 3, and 5 show relative positions in the two-step mode. FIGS. 2-5 show relative positions in the three-step mode.

Signals from the sensors 144, 145, 146, and 147 are used to provide information and to help in the control of the switching valve module 200 which, in turn, circulates fluid (oil) to the shaft driving units 124 that power the shafts 122. When a user actuates an "actuator" (e.g. the electronic control module 300), the actuator signals to a processing unit that has been programmed to carry out predetermined tasks. As shown in FIGS. 33-36, the processing unit uses information provided by the sensors 144, 145, 146, and 147 about the position of the magnets 142. (See, for example references to "HALL" in FIG. 35.) Information about the position of the magnets, in turn, provides information on the relative position of the associated cross-drives CD and group of slats. The processing unit sends a signal to the switching valve module 200 to switch the direction of fluid (oil) flow when the sensors 144, 145, 146, and 147 indicated that the end of a stroke has been reached.

It should be noted that, although the shown relative positions of the magnets 142 and the sensors 144, 145, 146, and 147 is a preferred configuration that is unique, the relative positions could be modified by changing the logic discussed herein.

It should be noted that although the magnets are shown as high-magnetic field density magnets, alternative magnets may be used including, but not limited to, electromagnets and low magnetic field density magnets.

It should be noted that, although the sensors 144, 145, 146, and 147 are discussed in terms of Hall Effect sensors, alternative preferred sensors or technology (e.g. a Reed switch) could be used instead of Hall Effect sensors. Further, in other alternative preferred systems, both the magnets and the sensors could be replaced using other proximity sensor technologies including, but not limited to, electromagnet technologies, capacitive technologies, inductive technologies, eddy current technologies, optical technologies, radar technologies, ultrasonic technologies, sonar technologies, and/or other sensor technology means known or yet to be discovered.

Electronic Control Module

FIGS. 19-20 show an exemplary preferred electronic control module 300 (see FIGS. 14-19) and components thereof. The electronic control module 300 functions as the user interface with the switching valve control system and/or the reciprocating slat-type conveyor. More specifically, the electronic control module 300 may be used to control on/off, directions (loading and unloading), and modes (two-step mode and three-step mode) by controlling the switching valve module 200 (solenoid operated four-way valve) via at least one processing unit. Among other things, the electronic control module 300 provides a more user-friendly and safer interface for the user as compared to the switching rod of the '231 patent. The processing unit may be associated with the electronic control module 300.

The shown preferred exemplary electronic control module 300 includes an electronic control mounted housing unit 310 (FIGS. 14-19) and an electronic control removable unit 320 (shown in detail in FIGS. 20-32). Alternative electronic control modules could include a mounted unit (distinct mounted unit) or only a mobile (not attached) unit (distinct mobile unit). In such a case, functional features discussed as being either on the mounted housing unit 310 or the removable unit 320 could be incorporated on the distinct mounted unit or the distinct mobile unit. The distinct mobile unit can be, for example, an independent device (like a key fob) or an application (program or subprogram) implemented on a computer (e.g. a smart phone).

The mounted housing unit 310 is generally mounted to the storage container (or other part of a movable vehicle). The location of the mounted housing unit 310, however, may be determined based on engineering or manufacturing efficiencies, regulations (e.g. safety regulations), and/or the needs of the user. The mounted housing unit 310 may include a relatively permanent user interface that may include, for example, user input mechanisms (e.g. at least one button 312 or a touch screen) and user output mechanisms (e.g. a screen 314, a warning light, or a lit button). The shown button 312 may be, for example, an emergency stop button that turns off the power to the processing unit and turns off power to all the inputs/outputs. Pressing the button 312 would shut down the whole control switching valve control system (when the outputs are turned off, the shaft driving units 124 (shown as hydraulic cylinders HC) are then isolated from the pressurized fluid (oil)). The shown mounted housing unit 310 also includes a storage tray 316 for the removable unit 320. The shown storage tray 316 (best seen in FIG. 19) is rotationally associated with the main body of the mounted housing unit 310. In a first position (shown in FIGS. 14-16), the shown rotational storage tray 316 holds the removable unit 320 securely within the mounted housing unit 310. In a second position (shown in FIGS. 17-19), the shown rotational storage tray 316 presents the removable unit 320 so that it is easily accessible to the user. There may be a latch to hold the storage tray 316 and/or for the user to engage to open the storage tray 316.

The shown electronic control removable unit 320 (also referred to as a pendant) allows the operator to stand away from the trailer to be safe. Using the electronic control removable unit 320 he can operate the switching valve control system from a safe distance. He can also take the electronic control removable unit 320 with him if he needs to view the rear of the trailer to see what is going on with the load. But the cable length is not long enough to allow the operator to stand in the pathway of the load.

The electronic control removable unit 320 can be divided into three portions: the controls 330, the reel 340, and the cable/line 350. Exemplary controls 330 are shown unattached from the reel 340 in FIGS. 20-24 and attached to the reel 340 in FIGS. 25-32. FIGS. 31 and 32 show the cable/line 350 wound around the reel 340 (inside the race of the reel 340). Using a reel 340 (with or without controls 330) to manage the cable/line 350 is unique in the reciprocating slat conveyor field. The shown reel 340 is an exemplary reel 340 that may be modified (e.g. it may be made of plastic or a more malleable polymer).

The controls 330 of the control removable unit 320 are shown as being very simple and user friendly. Specifically, the controls 330 are shown as three buttons 332, 334, 336 (FIG. 31). The buttons may be colored or labeled for easy understanding. For example the stop button may be red. The relative positions of the buttons may be changed. A first button 332 may be an on/off button that starts the reciprocating slat conveyor moving when it is pressed/released a first time. If the reciprocating slat conveyor is already moving, pressing/releasing the first button 332 stops the movement of the reciprocating slat conveyor. The logic for the first button 332 can be found in FIGS. 33-36 as, for example, "ON_OFF." A second button 334 may be a direction button that controls the direction of the reciprocating slat conveyor. If the reciprocating slat conveyor is moving in a loading direction, pressing/releasing the second button 334 changes the direction of the reciprocating slat conveyor to unloading. If the reciprocating slat conveyor is moving in an unloading direction, pressing/releasing the second button 334 changes the direction of the reciprocating slat conveyor to loading. The logic for the second button 334 can be found in FIGS. 33-36 as, for example, "DIRECTION," and "LOAD_UNLOAD." A third button 336 may be a mode button that controls the mode of the reciprocating slat conveyor. If the reciprocating slat conveyor is in a first mode (e.g. a two-step mode), pressing/releasing the third button 336 changes the mode of the reciprocating slat conveyor to a second mode (e.g. a three-step mode). If the reciprocating slat conveyor is in a second mode (e.g. a three-step mode), pressing/releasing the third button 336 changes the mode of the reciprocating slat conveyor to a first mode (e.g. a two-step mode). The logic for the third button 336 can be found in FIGS. 33-36 as, for example, "ACCELERATOR."

From the user's perspective, the manual operating mode changing event occurs when he pushes an "actuator" (e.g. an electronic button, switch, or other actuating mechanism) shown as the electronic control module 300 (and, specifically, the buttons 332, 334, 336 (FIG. 31) of the controls 330 of the control removable unit 320). The actuator sends at least one signal to a processing unit that has been programmed to carry out at least one predetermined task. Upon receiving at least one signal from the actuator, the processing unit carries out the predetermined task(s) by transmitting signals to the switching valve module 200. Depending on which button(s) 332, 334, 336 the user pushes, the processing unit sends at least one signal to the switching valve module 200 to turn the reciprocating slat conveyor on/off (button 332), to change the direction of the reciprocating slat conveyor (button 334), and/or to change the mode of the reciprocating slat conveyor (button 336).

Switching Valve Module

Figure 6:
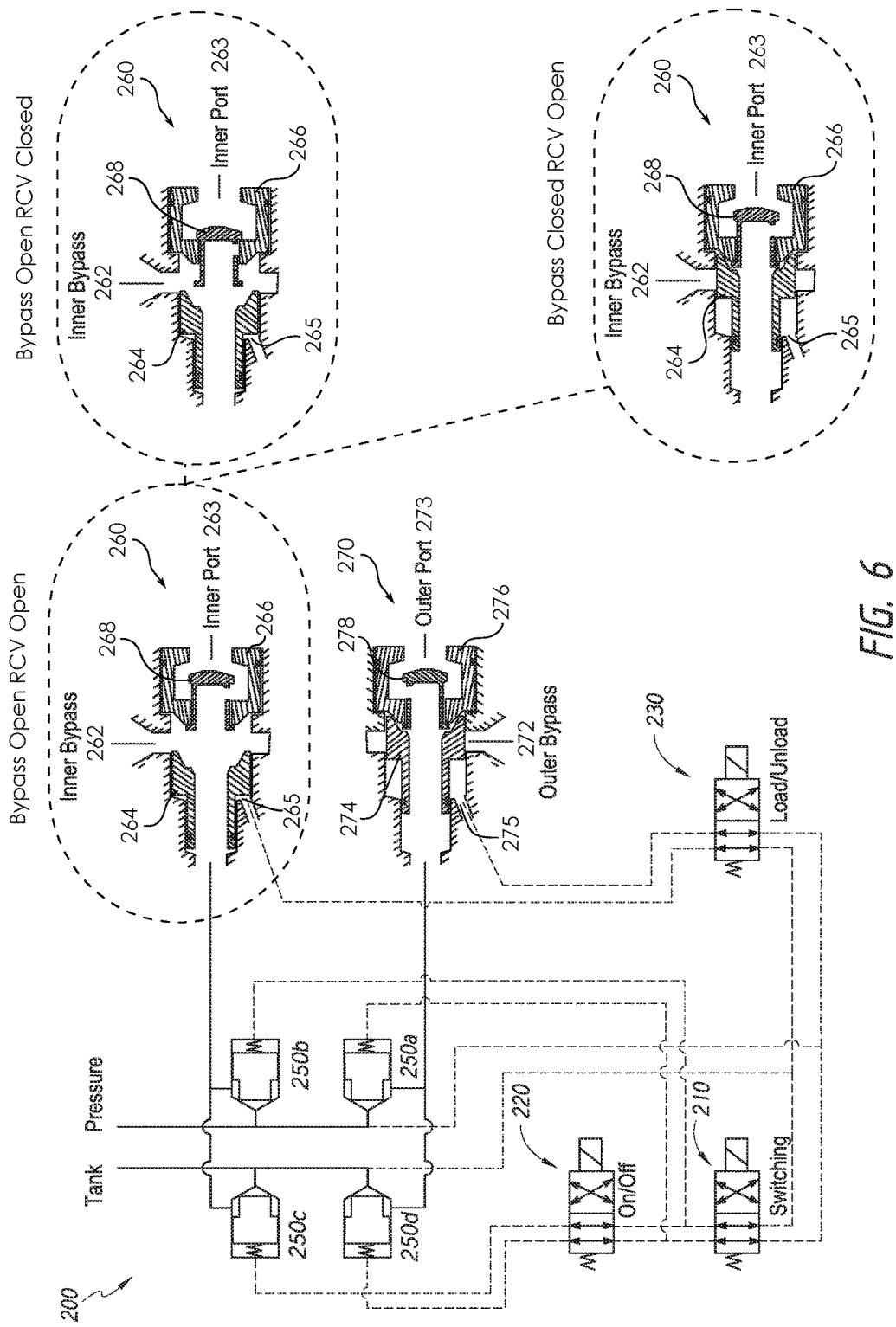
FIG. 6 is a hydraulic schematic of an exemplary preferred switching valve module, alternative positioning of the control valves being shown.
Figure 7:
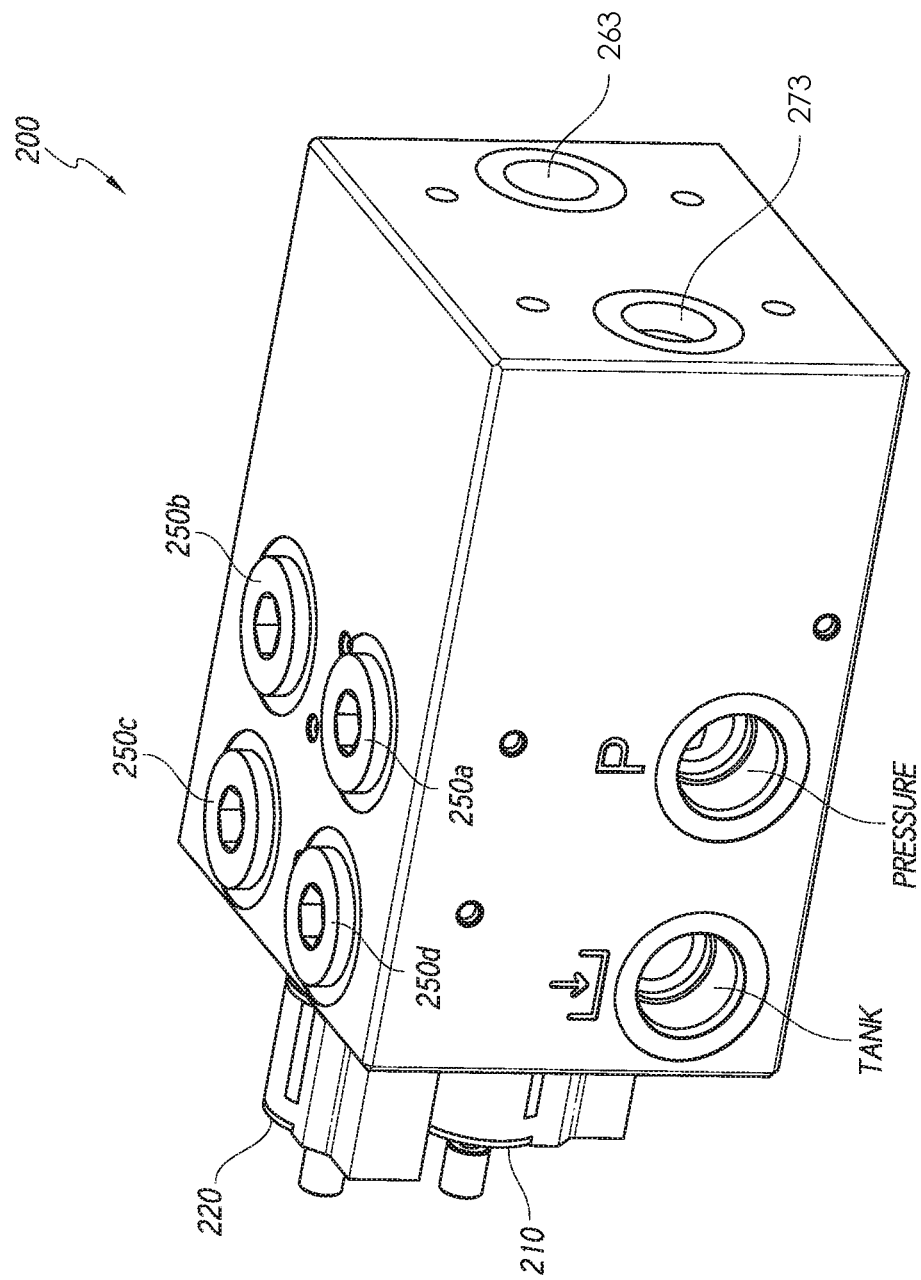
FIG. 7 is a perspective view of an exemplary preferred switching valve module.
Figure 8:
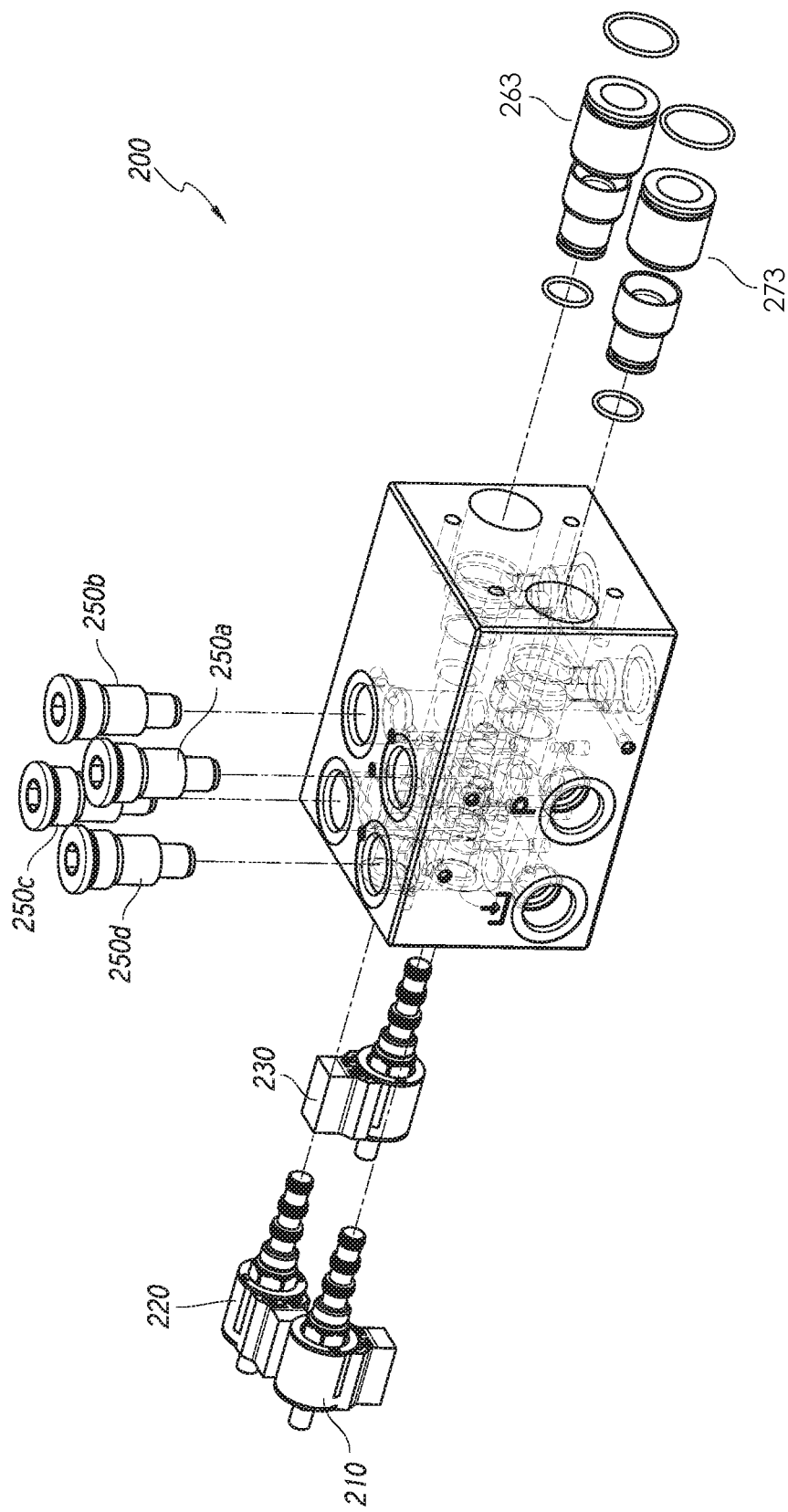
FIG. 8 is an exploded perspective view of an exemplary preferred switching valve module.
Figure 33:
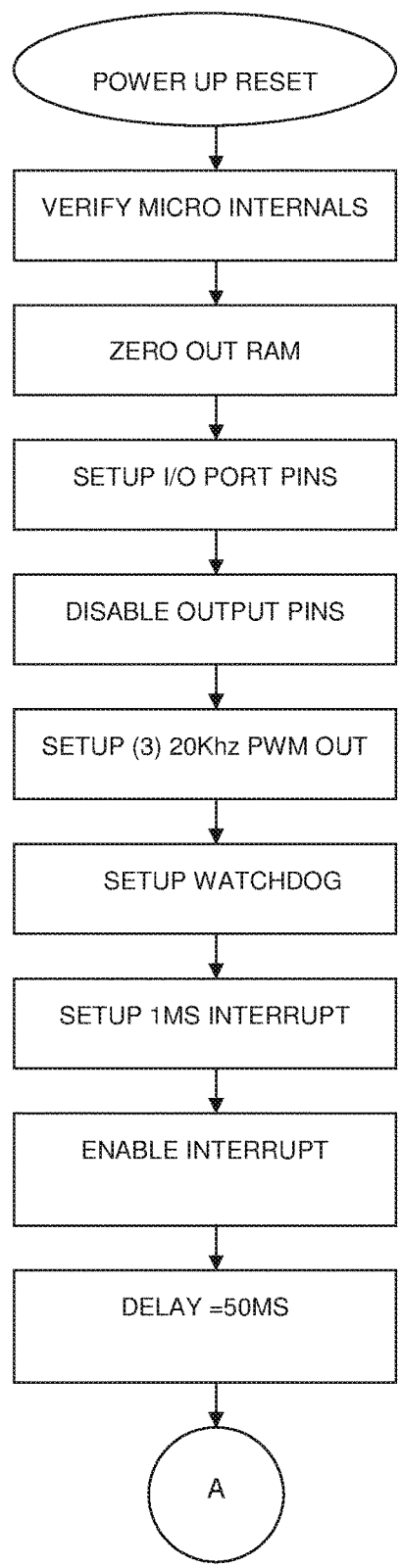
FIGS. 33-36 are flow charts of exemplary logic used by the processing unit.
Figure 34:
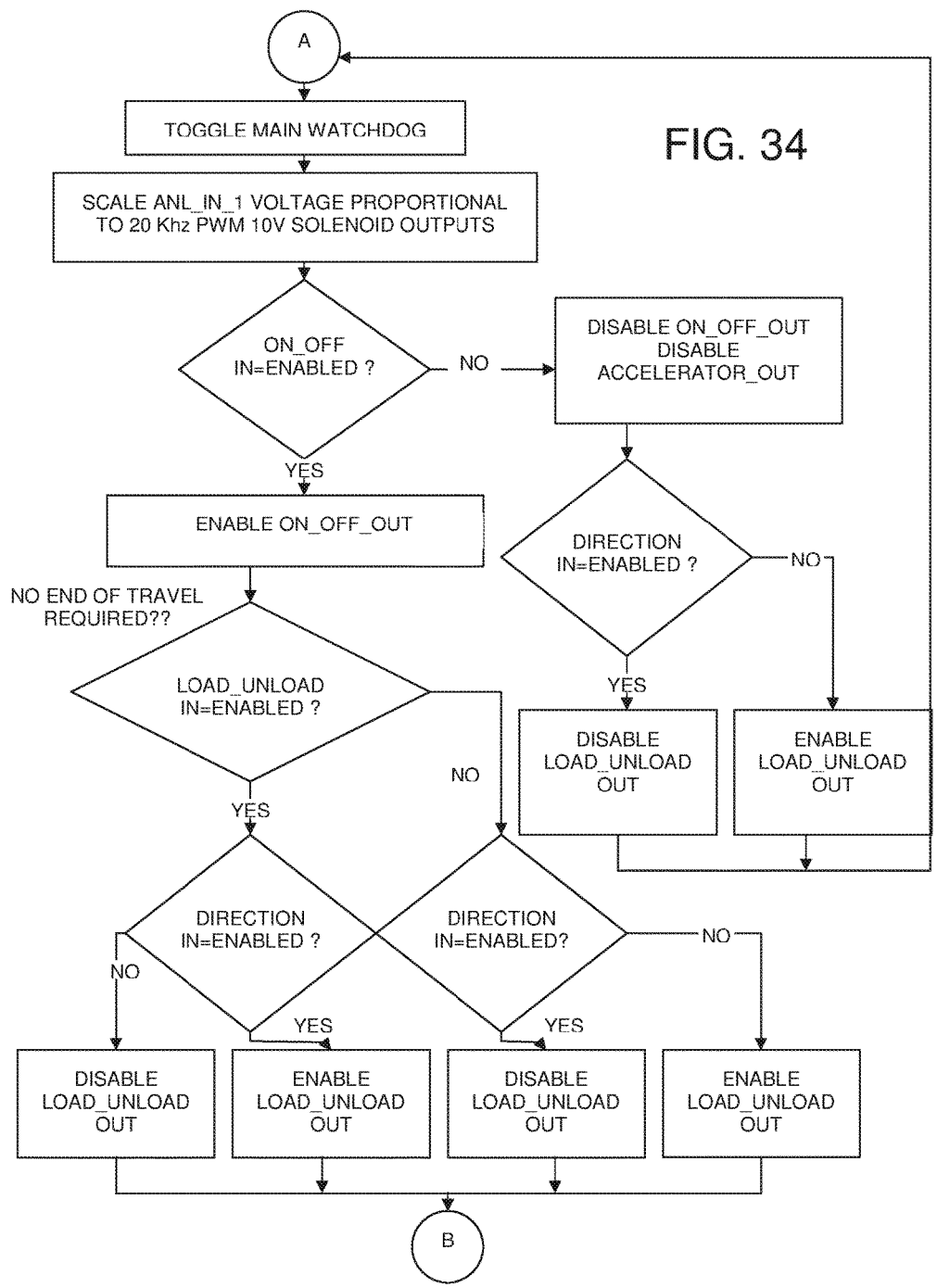
Figure 35:
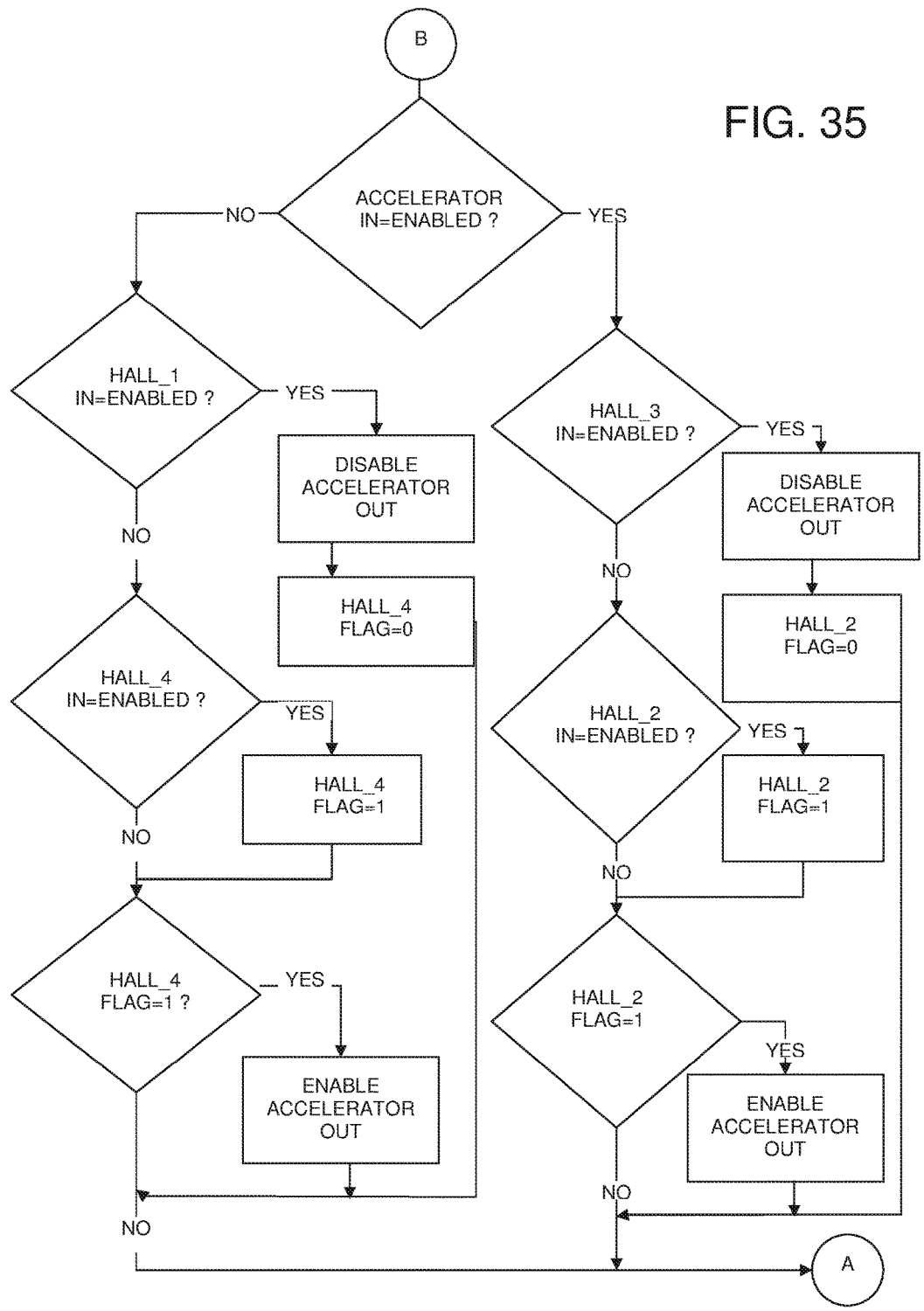
Figure 36:
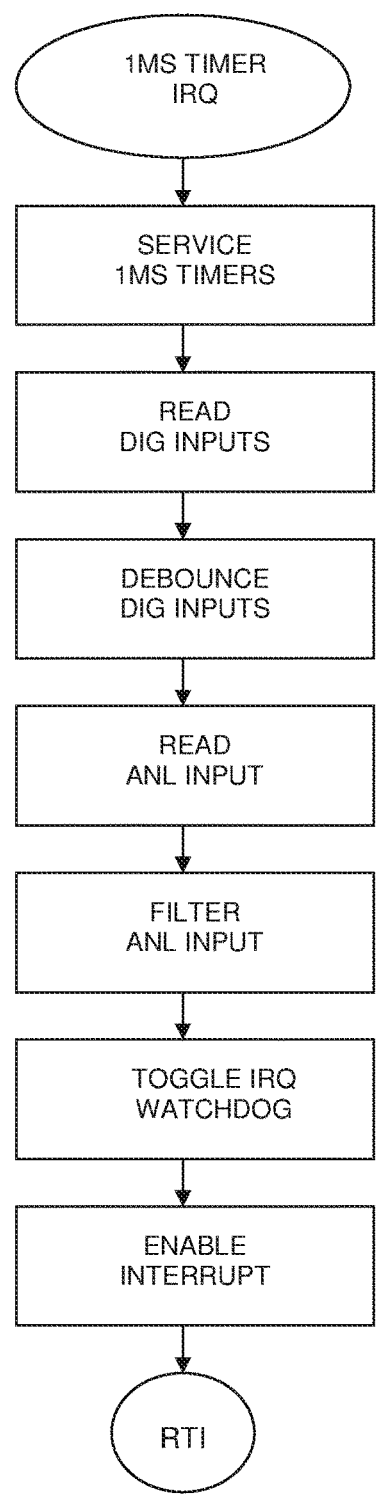

A preferred exemplary switching valve control system includes a switching valve module 200 which is shown as a solenoid operated four-way valve in FIGS. 6-13. FIG. 6 is a hydraulic schematic drawing, FIG. 7 is a perspective view drawing, and FIG. 8 is an exploded perspective view of the exemplary preferred switching valve module 200. FIGS. 9-13 (each figure including A-E) show configurations of the switching valve module 200 shown in exemplary preferred states. The switching valve module 200 is shown with a plurality of valves (solenoids 210, 220, and 230), a plurality of poppets (shown as poppets 250a, 250b, 250c, and 250d, but referred to jointly as poppets 250), and ports (shown as an inner port 263 with an inner bypass 262, and an outer port 273 with an outer bypass 272). The switching valve module 200 is also associated with (e.g. plumbed so that fluid may flow thereto) a return tank (shown or referred to as Tank in FIG. 6, an aperture labeled with a "bin" and an arrow in FIG. 7, and as R in the Switching Valve States Table) and Pressure Unit (shown or referred to as Pressure in FIG. 6, an aperture labeled with a "P" in FIG. 7, and as P in the Switching Valve States Table). The Pressure Unit may include a fluid pump.

The switching valve control system and multi-operating-mode (adaptable) reciprocating slat conveyor is shown and/or described in terms of an embodiment in which the switching valve module 200 is positioned toward the rear of the storage container as is common in the United States. In other countries, the switching valve module 200 would be positioned toward the front of the storage container. Accordingly, appropriate modifications (including the reversal of relative positions of components) to the system would be made.

The exemplary preferred switching valve module 200 is shown in FIGS. 7-13 as a single aluminum block "manifold" that includes a first valve 210, a second valve 220, and a third valve 230. How the valves 210, 220, 230 of the switching valve module 200 behave is controlled by the magnetic sensor module 140, the electronic control module 300, and/or the processing unit(s) (and the programming thereof). The magnetic sensor module 140 senses when the cross-drives CDs are at their ends of their strokes thus providing information about relative positioning of the cross-drives CDs. The electronic control module 300 functions as a user interface that allows a user to control functions such as on/off, load/unload direction, mode (two-step mode and three-step mode), and emergency stop (which may be actuated using an emergency stop button 312 on the mounted housing unit 310 of the electronic control module 300). A processing unit (e.g. a computer) that provides the logic (e.g. as shown in FIGS. 33-36) that controls the switching, on/off, and load/unload valves 210, 220, 230 based on inputs from the magnetic sensor module 140 and the electronic control module 300. The programming of the processing unit can be changed to effect the operation of the hydraulic module.

FIG. 6 is a hydraulic schematic of the switching valve module 200. It can be best understood with the following switching valve state table:

Switching Valve States

| Switching First Valve 210 | On/Off Second Valve 220 | Load/ Unload Third Valve 230 | OP | IP | OB | IB | Conveyor (RSC) |
|---|---|---|---|---|---|---|---|
| 0 | 0 | 0 | — | — | — | — | Off |
| 0 | 0 | 1 | — | — | — | — | Off |
| 0 | 1 | 0 | P | R | 0 | 1 | Retracting Separately |
| 0 | 1 | 1 | P | R | 1 | 0 | Retracting Together |
| 1 | 0 | 0 | — | — | — | — | Off |
| 1 | 0 | 1 | — | — | — | — | Off |
| 1 | 1 | 0 | R | P | 0 | 1 | Extending Together |
| 1 | 1 | 1 | R | P | 1 | 0 | Extending Separately |

The switching valve state table uses the following terms:
  zeros (0) represents or identifies "off" or "closed";
  and ones (1) represents or identifies "on" or "open";
  OP represents or identifies an Outside Port (shown in FIG. 6 as Outer Port 273);
  IP represents or identifies an Inside Port (shown in FIG. 6 as Inner Port 263);
  OB represents or identifies an Outside Bypass (shown in FIG. 6 as Outer Bypass 272);
  IB stands for Inside Bypass (shown in FIG. 6 as Inner Bypass 262);
  R represents or identifies Return Tank (shown in FIG. 6 as Tank); and
  P stands for Pressure (shown in FIG. 6 as Pressure).

The three columns representing valves each have a number ("0" or "1") that, when taken together, identify states. The switching valve module 200 is shown in relevant states shown in FIGS. 9-13. FIGS. 9A-9E (referred to generically as FIG. 9) show the switching valve module 200 in the "0-0-0" (see the state chart) or the "off" state. FIGS. 10A-10E (referred to generically as FIG. 10) show the switching valve module 200 in the "0-1-0" (see the state chart) or the "retracting separately state" state. FIGS. 11A-11E (referred to generically as FIG. 11) show the switching valve module 200 in the "0-1-1" (see the state chart) or the "retracting together state" state. FIGS. 12A-12E (referred to generically as FIG. 12) show the switching valve module 200 in the "1-1-0" (see the state chart) or the "extending together state" state. FIGS. 13A-13E (referred to generically as FIG. 13) show the switching valve module 200 in the "1-1-1" (see the state chart) or the "extending separately state" state.

The first valve 210 is a "switching valve" that is shown as a first solenoid operated four-way, two-position (bang bang or proportional) valve (also referred to as a four-way, two-position solenoid operated cartridge valve) controlling the pilot signals to four logic poppets 250 (poppet elements) which control the flow of fluid (oil) to a linear hydraulic motor. The flow direction of fluid (oil) is in a first direction through the shaft driving units 124 (shown as hydraulic cylinders HC) when the first valve 210 is in the "on" position. The flow direction of fluid (oil) through the shaft driving units 124 (shown as hydraulic cylinders HC) "switches" to flow in a second direction (e.g. opposite the first direction) when the first valve 210 is in the "off" position. Assuming the second valve 220 is "on" (the conveyor is on), if the first valve 210 is "off" (a "0" in the first valve column) the conveyor is retracting, but if the first valve 210 is "on" (a "1" in the first valve column) the conveyor is extending.

The second valve 220 is an "on/off valve" that is shown as a second solenoid operated four-way, two-position (bang bang type) valve (also referred to as a four-way, two-position solenoid operated cartridge valve) controlling which logic poppets 250 are switched by the first valve 210. When the second valve 220 is in the "on" mode, the first valve 210 controls a first pair of the poppets 250 (pilot chambers). When the second valve 220 is in the "off" mode, the first valve 210 controls a second pair of the poppets 250 (pilot chambers). Put another way, the second valve 220 changes the combination of the first valve 210 and the logic poppets 250 from a four-way valve function ("on" mode) to a function that routes all of the pressurized fluid (oil) flow back to the tank and completely blocks fluid from flowing through the linear hydraulic motor. The "off" mode stops the motion of the hydraulic motor by blocking the fluid flow through one of its operating ports (IP and IB make up one operating port, and OP and OB make up the other operating port). For example, FIG. 9B and FIG. 9C show poppets 250d and 250a are closed thereby blocking all flow of fluid (oil) to the outer operating port 273 and poppets 250b and 250c are open allowing the pressurized fluid to return to the tank. Depending on the state of the first valve 210, poppets 250d and 250a may be open and poppets 250b and 250c may be closed, but the effect is still the same. This configuration isolates the shaft driving units 124 (shown as hydraulic cylinders HC) from the pressurized fluid (oil). They are physically blocked from it. It is not just in neutral where the pressurized fluid (oil) goes back to the pump, but the system is still open to the circulating fluid (oil). As can be seen from the state chart, if the second valve 220 is "off" (a "0" in the second valve column), then the conveyor is off; and if the second valve 220 is "on" (a "1" in the second valve column), then the conveyor is on.

The third valve 230 is a "load/unload valve" that is shown as a third solenoid operated four-way (bang bang type) valve (also referred to as a four-way, two-position solenoid operated cartridge valve) that controls the position of two spools 264, 274 in the control valves (inner control valve 260 and outer control valve 270). The two spools 264, 274 open or close bypasses 262, 272 that control the sequencing of the shaft driving units 124 (shown as hydraulic cylinders HC) for changing the conveying direction (load or unload) of a reciprocating slat conveyor. If the first valve 210 is "off" (the conveyor is retracting) and the second valve 220 is "on" (the conveyor is on), if the third valve 230 is "off" (a "0" in the third valve column) then the slats operate (retract) separately, but if the third valve 230 is "on" (a "1" in the third valve column) then the slats operate (retract) together. If the first valve 210 is "on" (the conveyor is extending) and the second valve 220 is "on" (the conveyor is on), if the third valve 230 is "off" (a "0" in the third valve column) then the slats operate (extend) together, but if the third valve 230 is "on" (a "1" in the third valve column) then the slats operate (extend) separately.

The valves 210, 220, 230 are shown as "bang bang" valves such as a HydraForce SV08-40M cartridge valve with an ER style 10 VDC coil. With a "bang bang" valve there is no way to stop the valve at a partially switched position. Exemplary alternative "bang bang" valves that could also be used include, but are not limited to, the Parker DSL084 with an F coil, and a Sun Hydraulics DNDA valve.

The first valve 210 could be a "proportional" (to the electrical signal) four-way valve that would give more control over how fast the switch takes place. (Theoretically, the other valves 220, 330 could be proportional, but there is no need for this.) This would be helpful if there were problems with extreme hydraulic shock. Using an electro-proportional valve would allow more precise control of the switching characteristics of the valve. A computer program would control the signal (voltage or current) that was sent to the solenoid of the electro-proportional valve. The valve would move to a location in its stroke that corresponded to the signal (voltage or current). A pressure sensor or a flow sensor could be added to the area that was experiencing shock to send a feedback value that could be used to control the current or voltage level sent to the valve in order to adapt the valve operation to pressure conditions downstream. An example of an electro-proportional valve that would work would be the HydraForce SP08-47C four-way, 3 position, closed center. This valve would be used instead of the bang bang valves (e.g. SV08-40M) mentioned above. It would allow the logic elements to be gradually opened and closed smoothing the transition between one flow direction to the other flow direction.

Yet another alternative valve that could be used for valves 210, 220, 230 is a pilot operated solenoid valve. As the valves 210, 220, 230 are controlling a very small volume of fluid (oil), direct acting valves are sufficient. Although using a pilot operated solenoid valve would function properly, it would add unnecessary cost.

A poppet 250 is a check valve (a valve that closes to prevent backward flow of liquid) that is formed by seating a conical plug into a cylindrical hole. It is at least generally understood that any valve that uses these two shapes to control flow between two points is called a poppet. The poppets 250 may be logic valve elements. The poppets 250 of the switching valve module 200 allow large flow rates of fluid (oil) through the switching valve with very little power loss. The switching valve module 200, as described herein, uses the same four poppets 250 for both switching control (using the first valve 210) and on-off control (using the second valve 220). This is accomplished by the four poppets 250 (divided into two groups of two switching poppets (pairs)) being controlled by the first valve 210, but with the second valve 220 controlling which poppets are in each group. Finally, the bypass spools 264, 274 are made up of combined spool and poppet features so that the switching valve module 200 will not leak and still allows fairly loose clearances to make the switching valve module 200 easier to manufacture.

The shown poppets 250 may be, for example, HydraForce EP20-S38 or Parker 16SLC3-A (Parker Hannifin Corporation). A poppet-type valve that can be opened and closed via a pilot signal is called a logic element. A logic element could take the form of a spool-type valve as well. A spool-type valve controls flow between two ports in a cylindrical hole by sliding a tight fitting cylinder across them (covering them). Unless set forth otherwise herein, the poppets 250 may be replaced by spool-type valves or other check valves that could fulfill the function of the disclosed poppets 250.

As shown, the switching valve module 200 includes an inner control valve 260 and an outer control valve 270. As set forth above, the control valves 260, 270 control the sequencing of the shaft driving units 124 (shown as hydraulic cylinders HC) for changing the conveying direction (load or unload) of a reciprocating slat conveyor. The control valves 260, 270 are shown as including ports 263, 273 that are intersected by a bypass 262, 272.

Within the ports 263, 273 are respective spools 264, 274. The spools 264, 274 may be any cylindrical component that slides inside a channel with at least one intersecting side port. The side ports are opened and closed as the spool 264, 274 slides to cover or uncover the side ports which, in this case, are the openings associated with the bypasses 262, 272. When the spool 264, 274 slides to cover the opening to the bypass 262, 272, it creates a spool-type seal. In FIG. 6, the "bypass closed and remedial check valve open" outtake shows the control valve 260 with the spool 264 covering the bypass 262 and creating a spool-type seal. The sliding spools 264, 274, therefore, open or close bypasses 262, 272 that control the sequencing of the shaft driving units 124 (shown as hydraulic cylinders HC) for changing the conveying direction (load or unload) of a reciprocating slat conveyor.

Also associated with the ports 263, 273 are respective control valve seats 266, 276. The shown control valve seats 266, 276 are within the ports 263, 273. It should be noted that the control valve seats 266, 276 may be a separate component or they may be part of the housing (e.g. the block "manifold"). In addition to opening and closing the bypasses 262, 272 as they slide, the spools 264, 274 also move forward so that the annular front ends of the spools 264, 274 engage (e.g. come into relatively firm contact with) the annular back ends of the control valve seats 266, 276. The contact between the spools 264, 274 and the control valve seats 266, 276 makes a poppet-type seal. The poppet-type seal provides an extra seal that backs-up or provides redundancy to the spool-type seal to prevent leaking.

The shown, exemplary preferred spool-type seal and poppet-type seal are both coaxial with the axis of their respective ports.

The sliding of the spools 264, 274 are shown as being controlled by the third valve 230. More specifically, the third valve 230 selectively provides pressure to the pilot chambers 265, 275 which causes the spools 264, 274 to slide left or right. As shown, tank applies to the pilot chamber 265, 275, then the spool slides to the left. As shown, when pressure applies to the pilot chamber 265, 275, then the spool 264, 274 slides to the right (see the alternative position shown in FIG. 6).

The control valves 260, 270 may, optionally, include at least one remedial check valve 268, 278 that prevents the slats from moving independently when they should move together in line with the flow of fluid (oil) and the spools 264, 274. Control valves 260, 270 that include a remedial check valve function as restricted check valves. Restricted check valves have a remedial check valve that makes it so that the cross-drives are more likely to move together when they are supposed to move together. Without this feature, the cross-drives may not always move together when they should (such as when the slats on one cross-drive have more friction than the others). This makes the switching valve module 200 more compact and reduces the power loss from friction as compared with known systems.

One, both, or neither of the ports 263, 273 may include a remedial check valve 268, 278. FIG. 6 shows both ports 263, 273 including a remedial check valve 268, 278. FIGS. 9-13 show only the outer port 273 having a check valve 278.

As shown in FIG. 6, there are three positions of the control valves 260, 270 that have a remedial check valve 268, 278: "bypass open and remedial check valve open"; "bypass open and remedial check valve closed"; and "bypass closed and remedial check valve open." When the spool 264, 274 slides to uncover the bypass 262, 272, the remedial check valve 268, 278 can move back and forth, depending on the direction of fluid (oil) flow. When the spool 264, 274 is open, if the fluid (oil) is flowing from the pressure to the hydraulic cylinders, then the RCV will be open allowing the fluid (oil) to flow through the port 263, 273. When the spool 264, 274 is open, if the fluid (oil) is flowing from the shaft driving units 124 (hydraulic cylinders) to the tank, then the RCV will be closed to block flow through the port 263, 273. In FIG. 13E, the fluid (oil) flow is from the pressure toward the shaft driving units 124 (hydraulic cylinders) through the outer port 273 and the outer bypass 272. The remedial check valve 278 is "on" and allows this flow to the outer port 273. In FIG. 11E, the fluid (oil) flow is from the shaft driving units 124 (hydraulic cylinders) toward the tank through the outer control valve 270. The fluid flowing closes the RCV to block fluid flow through the outer port 273. This forces fluid (oil) flow through the bypass 272. This restricts the movement of the primary cylinder, making it stay together with the other cylinders. The "bypass closed and remedial check valve open" position is when the spool 264, 274 slides to cover the bypass 262, 272 and opens the remedial check valve 268, 278 so that it doesn't matter which direction fluid (oil) flows.

Flowcharts

FIGS. 33-36 are flow charts illustrating methods and systems. It will be understood that each block of these flow charts, components of all or some of the blocks of these flow charts, and/or combinations of blocks in these flow charts, may be implemented by software (e.g. computer program instructions, software programs, subprograms, coding, or other series of computer-executable or processor-executable instructions), by hardware (e.g. processors, memory), by firmware, and/or a combination of these forms. As an example, in the case of software, computer program instructions (computer-readable program code) may be loaded onto at least one processing unit to produce a machine, such that the instructions that execute on the processing unit(s) create structures for implementing the functions specified in the flow chart block or blocks. These computer program instructions may also be stored in a memory that can direct a processing unit to function in a particular manner, such that the instructions stored in the memory produce an article of manufacture including instruction structures that implement the function specified in the flow chart block or blocks. The computer program instructions may also be loaded onto a computer to cause a series of operational steps to be performed on or by the computer to produce a computer implemented process such that the instructions that execute on the computer provide steps for implementing the functions specified in the flow chart block or blocks. The term "loaded onto a computer" also includes being loaded into the memory of the computer or a memory associated with or accessible by the computer. The term "memory" is defined to include any type of computer (or other technology)-readable media including, but not limited to, attached storage media (e.g. hard disk drives, network disk drives, servers), internal storage media (e.g. RAM, ROM, removable storage media (e.g. CDs, DVDs, flash drives, memory cards, floppy disks), and/or other known or yet to be discovered storage media. Accordingly, blocks of the flow charts support combinations of steps, structures, and/or modules for performing the specified functions. It will also be understood that each block of the flow charts, and combinations of blocks in the flow charts, may be divided and/or joined with other blocks of the flow charts without affecting the scope of the invention. This may result, for example, in computer-readable program code being stored in whole on a single memory, or various components of computer-readable program code being stored on more than one memory.

Definitions

This section may be used to understand and expand upon the basic concepts of a switching valve control system and a reciprocating slat-type conveyor. Please note that the terms and phrases may have additional definitions and/or examples throughout the specification. Where otherwise not specifically defined, words and phrases are given their ordinary meaning in the art. Exemplary embodiments may be better understood with reference to the drawings, but these embodiments are not intended to be of a limiting nature. The same reference numbers will be used throughout the drawings and description in this document to refer to the same or like parts.

The phrase "storage container" is shown as the load-holding compartment of a load transport vehicle. Exemplary storage containers may include, for example, a mobile cargo trailer, a bed of a truck (truck bed), a rear portion of a semi-trailer, a cargo container, a container portion of a van-truck, stationary bins, or any mobile or stationary load holder.

The term "slats" (also referred to as "conveyor slats," "floor slats," or "deck slats") refers to elongated members that, together, form at least part of the reciprocating slat-type conveyors. The design of the slats, including length, width, and thickness, depends upon factors including the dimensions of the floor, the construction material, and the application(s) for which the conveyor is to be used. Reciprocating slat-type conveyors (as described herein) generally include a plurality of elongated slats. Slats are arranged in groups of slats (a group generally includes at least three slats, although it is to be understood that each group may include any desired number in excess of two). Generally, the first slat of each group is connected to the first slat of all the other groups, the second slat of each group is connected to or synced with the second slat of all the other groups, and so on. Some slats may be fixed (unmoving).

The phrase "guide beam" is meant to describe a longitudinal member (or plurality of members) that, at least partially supports and guides an associated slat. The guide beam provides the structure upon which the slat slides. The guide beams (or the optional bearings) may be made from a low friction material that permits easy sliding of the slats in relation to the guide beams. Alternatively, the slats may be made from a low friction material that permits easy sliding of the slats in relation to the guide beams. Another alternative would be that both guide beams (or the optional bearings) and the slats may be made from a low friction material.

The phrase "reciprocating slat-type conveyors" (also known as "RSCs," "conveyor systems," "live floor conveyors," "reciprocating slat conveyors," or "conveyors") generally include a plurality of elongated slats. Reciprocating slat-type conveyors generally include a plurality of groups of elongated slats. Generally, all the slats of a reciprocating slat conveyor move simultaneously (in unison) in one direction (the "load-conveying direction") taking the load with them. Then one slat of each group (e.g. the first slat of each group) moves in the opposite direction (the "retraction direction") return to their starting position, followed by another slat of each group (e.g. the second slat of each group), and so on until all the slats of the groups are retracted. The stationary slats (those not currently returning) hold the load at least partially in place until the next cycle begins. This operation results in a step-wise advance (in the load-conveying direction) of particulate matter positioned on the floor that may be followed by partial retraction of the particulate matter on the floor.

The phrase "power unit" is meant to describe any source of power that may be associated with and used to move the slats of the conveyor system. An exemplary power system is a two-way, variable-speed, hydraulic power unit. The size and location of the power unit depends upon the application(s) of the conveyor system. Alternative power units known (including those shown and described in any of the references that are incorporated-by-reference herein) and yet to be discovered may be used.

The switching valve control system described herein may have associated hardware, firmware (a variation, subset, or hybrid of hardware and/or software), and/or software. The hardware (or firmware) of the switching valve control system will be described as at least one "processing unit" (which is meant to be broadly interpreted to include any type of "processor," "computer," "programmable apparatus," and/or other known or yet to be discovered devices capable of executing instructions or steps). The term "software" includes at least one "program," "subprogram," "series of instructions," or other known or yet to be discovered hardware instructions or hardware-readable program code. Software may be loaded onto the processing unit(s) to produce a machine, such that the software executes on the processing unit(s) to create structures for implementing the functions described herein. Further, the software may be loaded onto the processing unit(s) so as to direct the switching valve control system to function in a particular manner described herein or to perform a series of operational steps as described herein. The phrase "loaded onto the processing unit(s)" also includes being loaded into memory associated with or accessible by the processing unit(s). Appropriate "signals," "communications," and/or "transmissions" (which include various types of information and/or instructions including, but not limited to, data, commands, bits, symbols, voltages, currents, electromagnetic waves, magnetic fields or particles, optical fields or particles, and/or any combination thereof) over appropriate "communication paths," "transmission paths," and other means for signal transmission including any type of connection between two elements on the system.

The term "processing unit" (or "processor" or "computer") is defined as at least one device capable of executing instructions or steps and may be implemented as a programmable logic device or other type of known or yet to be discovered programmable apparatus. The processing unit(s) may have associated memory. The processing unit(s) may be implemented using a general purpose processor (e.g. microprocessor, controller, microcontroller, or state machine), a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. Even if it is described as a single processing unit(s), it should be noted that a processing unit may be implemented as a plurality of separate processing units. Similarly, multiple processing units may be combined to create a functionally single processing unit.

The term "memory" is defined to include any type of computer (or other technology)-readable media (also referred to as machine-readable storage medium) including, but not limited to, attached storage media (e.g. hard disk drives, network disk drives, servers), internal storage media (e.g. RAM, ROM, EPROM, FLASH-EPROM, or any other memory chip or cartridge), removable storage media (e.g. CDs, DVDs, flash drives, memory cards, floppy disks, flexible disks), firmware, and/or other known or yet to be discovered storage media. Depending on its purpose, the memory may be transitory and/or non-transitory. Although referred to as a single unit of memory, it should be noted that the memory may be implemented as a plurality of separate memories. Similarly, multiple memories or sub-memories may be combined.

It should be noted that the terms "programs" and "subprograms" are defined as a series of instructions that may be implemented as software (i.e. computer program instructions or computer-readable program code) that may be loaded onto a computer to produce a machine, such that the instructions that execute on the computer create structures for implementing the functions described herein or shown in the figures. Further, these programs and subprograms may be loaded onto a computer so that they can direct the computer to function in a particular manner, such that the instructions produce an article of manufacture including instruction structures that implement the function specified in the flow chart block or blocks. The programs and subprograms may also be loaded onto a computer to cause a series of operational steps to be performed on or by the computer to produce a computer implemented process such that the instructions that execute on the computer provide steps for implementing the functions specified in the flow chart block or blocks. The phrase "loaded onto a computer" also includes being loaded into the memory of the computer or a memory associated with or accessible by the computer. The shown programs and subprograms may be divided into multiple modules or may be combined.

The terms "signals," "communications," and/or "transmissions" include various types of information and/or instructions including, but not limited to, data, commands, bits, symbols, voltages, currents, electromagnetic waves, magnetic fields or particles, optical fields or particles, and/or any combination thereof. Appropriate technology may be used to implement the "signals," "communications," and/or "transmissions" including, for example, transmitters, receivers, and transceivers. "Signals," "communications," and/or "transmissions" described herein would use appropriate technology for their intended purpose. For example, hard-wired communications (e.g. wired serial communications) would use technology appropriate for hard-wired communications, short-range wireless communications (e.g. BLUETOOTH®, Ultra Wideband (UWB), or infrared or induction wireless) would use technology appropriate for short distance wireless communications, and long-range wireless communications (e.g. WiFi or Cellular) would use technology appropriate for long distance wireless communications. Appropriate security (e.g. SSL or TLS) for each type of communication is included herein.

When used in relation to the term "signals," the terms "provide," and "providing," "send," and/or "sending" (and variations thereof) are meant to include standard means of provision including "transmit" and "transmitting," but can also be used for non-traditional provisions as long as the "signals" are "received" (which can also mean obtained). The terms "receive" and "receiving" (and variations thereof) are meant to include standard means of reception, but can also be used for non-traditional methods of obtaining as long as the "signals" are "obtained."

The term "associated" is defined to mean attached (directly or indirectly), connected (including functionally connected), positioned near, integral or original, retrofitted, and/or accessible by. For example, shafts that are associated with their respective cross-drives CD may be directly or indirectly attached thereto (e.g. by means of a bracket). Another example is that cross-drives CD that are associated with their respective slats (not shown) may be functionally connected and/or slidingly connected.

It should be noted that relative terms (including such modifiers as "a," "b," and "c" or "A," "B," and "C") are meant to help in the understanding of the technology and are not meant to limit the scope of the invention. Similarly, unless specifically stated otherwise, the terms "first," "second," and "third" are meant solely for purposes of designation and not for order or limitation. For example, the "first end of shaft" has no order relationship with the "second end of shaft."

It should be noted that some terms, phrases, and visual indications used in this specification and drawings are meant to be relative. These terms may also be considered labels for general understanding. For example, terms such as "inner" and "outer" could be modified, depending on the orientation. Terms such as "front" and "back" could be modified, depending on the orientation. Similarly, terms such as "left" and "right" (or any other set of relative terms) could be modified, depending on the orientation. For example, the switching valve module 200 may be rotated (although appropriate modifications may be necessary), and the terms, phrases, and visual indications would change accordingly. Put another way, rotation of the system or component that would change the designation might change the terminology, but not the concept. Further, the shown switching valve control system and multi-operating-mode (adaptable) reciprocating slat conveyor are shown and described in terms of an embodiment in which the switching valve module 200 is positioned toward the rear of the storage container as is common in the United States. In other countries, the switching valve module 200 would be positioned toward the front of the storage container. Accordingly, appropriate modifications (including the reversal of relative positions of components) to the system would be made.

It should be further noted that although the switching valve control system is described in terms of modules (modular components) and/or data components, the terms are not meant to be limiting. Modules may be divided into submodules. Modules that are described in isolation could be combined. At times the modules may overlap and/or have overlapping components.

The terms "may," "might," "can," and "could" are used to indicate alternatives and optional features and only should be construed as a limitation if specifically included in the claims. For example, the phrase the "shaft driving unit 124 may include a piston and a cylinder" indicates that the shaft driving unit may be implemented in other known or yet to be discovered. It should be noted that the various modules, components, features, steps, or embodiments thereof are all "preferred" whether or not they are specifically indicated. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type. For example, the shown "exemplary reel 340" is just one example of a reel, but other reels could be just as desirable.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

MISCELLANEOUS

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

It is to be understood that for methods or procedures disclosed herein that include one or more steps, actions, and/or functions for achieving the described actions and results, the methods' steps, actions, and/or functions may be interchanged with one another without departing from the scope of the present invention. In other words, unless a specific order of steps, actions, and/or functions is required for proper or operative operation of the methods or procedures, the order and/or use of specific steps, actions, and/or functions may be modified without departing from the scope of the present invention.

All references (including, but not limited to, publications, patents, and patent applications) cited herein, whether supra or infra, are hereby incorporated by reference in their entirety. In addition, known patents (including many owned by applicant) may be used to provide specifics and/or variations. The following patent references (in addition to others described herein) are all incorporated by reference in their entirety: U.S. Pat. No. 8,887,896 to Berthelsen et al., U.S. Pat. No. 8,827,624 to Hallstrom, U.S. Pat. No. 8,616,365 to Berthelsen et al., U.S. Pat. No. 8,430,231 to Almond, U.S. Pat. No. 8,215,478 to Almond, U.S. Pat. No. 8,123,454 to Hallstrom, U.S. Pat. No. 7,926,646 to Berthelsen et al., U.S. Pat. No. 4,580,678 to Foster, U.S. Pat. No. 4,856,645 to Hallstrom, U.S. Pat. No. 4,962,848 to Foster, U.S. Pat. No. 3,534,875 to Hallstrom, U.S. Pat. No. 4,143,760 to Hallstrom, and U.S. Pat. No. 4,793,468 to Hamilton.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

It is to be understood that for methods or procedures disclosed herein that include one or more steps, actions, and/or functions for achieving the described actions and results, the methods' steps, actions, and/or functions may be interchanged with one another without departing from the scope of the present invention. In other words, unless a specific order of steps, actions, and/or functions is required for proper or operative operation of the methods or procedures, the order and/or use of specific steps, actions, and/or functions may be modified without departing from the scope of the present invention.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A switching valve module, comprising:
   (a) an inner control valve and an outer control valve; and
   (b) a spool positioned within said inner control valve and a spool positioned within said outer control valve;
   (c) wherein movement of each said spool creates both a spool-type seal and a poppet-type seal between the spool and the respective control valve.

2. The switching valve module of claim 1, said inner control valve and said outer control valve being controlled to change the conveying direction of a reciprocating slat conveyor between a load conveying direction and an unload conveying direction.

3. The switching valve module of claim 1, further comprising:
   (a) said inner control valve further comprising
      (i) an inner port with an inner bypass, said inner bypass intersecting said inner port;
      (ii) an inner control valve seat associated with said inner port;
      (iii) said spool-type seal forming when said spool positioned within said inner control covers said inner bypass; and
      (iv) said poppet-type seal forming when said spool positioned within said inner control engages said inner control valve seat; and
   (b) said outer control valve;
      (i) an outer port with an outer bypass, said outer bypass intersecting said outer port;
      (ii) an outer control valve seat associated with said outer port;
      (iii) said spool-type seal forming when said spool positioned within said outer control covers said outer bypass; and
      (iv) said poppet-type seal forming when said spool positioned within said outer control engages said outer control valve seat.

4. The switching valve module of claim 1, at least one of said inner control valve and said outer control valve having a remedial check valve.

5. The switching valve module of claim 1, said switching valve module for use with a reciprocating slat-type conveyor for loading and unloading a container, said reciprocating slat-type conveyor having a plurality of slats, said plurality of slats arranged side-by-side for conveying a load in one of a first operational direction and a second operational direction, said plurality of slats grouped in at least two sets of slats, each set of slats joined together for simultaneous reciprocative movement, said plurality of slats arranged in a plurality of groups, each group having at least one correspondingly positioned slat within each set of slats.

6. The switching valve module of claim 1, further comprising:
   (a) a first valve, a second valve, and a third valve;
   (b) a plurality of poppets, said plurality of poppets dividable into a first pair of poppets and a second pair of poppets;
   (c) said first valve controlling said plurality of poppets;
   (d) said second valve controlling which poppets are in said first pair of poppets and which poppets are in said second pair of poppets; and
   (e) said third valve controlling said inner control valve and said outer control valve to change the conveying direction of a reciprocating slat conveyor between a load conveying direction and an unload conveying direction.

7. A switching valve module for use with a reciprocating slat-type conveyor for loading and unloading a container, said reciprocating slat-type conveyor having a plurality of slats, said plurality of slats arranged side-by-side for conveying a load in one of a first operational direction and a second operational direction, said plurality of slats grouped in at least two sets of slats, each set of slats joined together for simultaneous reciprocative movement, said plurality of slats arranged in a plurality of groups, each group having at least one correspondingly positioned slat within each set of slats, said switching valve module comprising:

(a) an inner control valve and an outer control valve;
(b) a movable spool positioned within said inner control valve and a movable spool positioned within said outer control valve;
(c) said inner control valve further comprising:
  (i) an inner port with an inner bypass, said inner bypass intersecting said inner port;
  (ii) an inner control valve seat associated with said inner port;
  (iii) a spool-type seal being formed when said movable spool positioned within said inner control covers said inner bypass; and
  (iv) a poppet-type seal being formed when said movable spool positioned within said inner control engages said inner control valve seat; and
(d) said outer control valve further comprising:
  (i) an outer port with an outer bypass, said outer bypass intersecting said outer port;
  (ii) an outer control valve seat associated with said outer port;
  (iii) a spool-type seal being formed when said movable spool positioned within said outer control covers said outer bypass; and
  (iv) a poppet-type seal being formed when said movable spool positioned within said outer control engages said outer control valve seat.

8. The switching valve module of claim 7, said inner control valve and said outer control valve being controlled to change the conveying direction of a reciprocating slat conveyor between a load conveying direction and an unload conveying direction.

9. The switching valve module of claim 7, at least one of said inner control valve and said outer control valve having a remedial check valve.

10. The switching valve module of claim 7, further comprising:
(a) a first valve, a second valve, and a third valve;
(b) a plurality of poppets, said plurality of poppets dividable into a first pair of poppets and a second pair of poppets;
(c) said first valve controlling said plurality of poppets;
(d) said second valve controlling which poppets are in said first pair of poppets and which poppets are in said second pair of poppets; and
(e) said third valve controlling said inner control valve and said outer control valve to change the conveying direction of a reciprocating slat conveyor between a load conveying direction and an unload conveying direction.

11. A switching valve module for use with a reciprocating slat-type conveyor for loading and unloading a container, said reciprocating slat-type conveyor having a plurality of slats, said plurality of slats arranged side-by-side for conveying a load in one of a first operational direction and a second operational direction, said plurality of slats grouped in at least two sets of slats, each set of slats joined together for simultaneous reciprocative movement, said plurality of slats arranged in a plurality of groups, each group having at least one correspondingly positioned slat within each set of slats, said switching valve module comprising:
(a) a first valve, a second valve, and a third valve;
(b) a plurality of poppets, said plurality of poppets dividable into a first pair of poppets and a second pair of poppets;
(c) an inner control valve and an outer control valve;
(d) said first valve controlling said plurality of poppets;
(e) said second valve controlling which poppets are in said first pair of poppets and which poppets are in said second pair of poppets; and
(f) said third valve controlling said inner control valve and said outer control valve to change the conveying direction of said reciprocating slat conveyor between a load conveying direction and an unload conveying direction.

12. The switching valve module of claim 11, wherein said switching valve module controls a multi-operating-mode reciprocating slat conveyor.

13. The switching valve module of claim 11, wherein said switching valve module is controlled based on input from a sensor module that provides information about the relevant position of said slats.

14. The switching valve module of claim 11, wherein said switching valve module is controlled based on input from an electronic control module that functions as a user interface.

15. The switching valve module of claim 11, wherein said switching valve module is controlled based on input from a sensor module that provides information about the relevant position of said slats, and based on input from an electronic control module that functions as a user interface.

16. The switching valve module of claim 11, wherein said plurality of poppets are to switch high volume flow of fluid to cylinders of said reciprocating slat conveyor, and said same plurality of poppets are used to block flow of fluid to the cylinders and open flow back to a tank and thereby turn said reciprocating slat-type conveyor off.

17. The switching valve module of claim 11, said inner control valve and said outer control valve each having a spool that creates both a spool-type seal and a poppet-type seal.

18. The switching valve module of claim 11, at least one of said inner control valve and said outer control valve having a remedial check valve.

* * * * *